(12) United States Patent
Mizuta

(10) Patent No.: US 12,554,148 B2
(45) Date of Patent: Feb. 17, 2026

(54) OPHTHALMIC OPTICAL SYSTEM, OPHTHALMIC DEVICE, AND OPHTHALMIC SYSTEM

(71) Applicant: NIKON CORPORATION, Tokyo (JP)

(72) Inventor: Masahiro Mizuta, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 1012 days.

(21) Appl. No.: 16/999,770

(22) Filed: Aug. 21, 2020

(65) Prior Publication Data

US 2020/0387007 A1 Dec. 10, 2020

Related U.S. Application Data

(63) Continuation of application No. PCT/JP2019/006608, filed on Feb. 21, 2019.

(30) Foreign Application Priority Data

Feb. 23, 2018 (JP) ................. 2018-031110

(51) Int. Cl.
G02C 7/02 (2006.01)
A61B 3/10 (2006.01)
A61B 3/12 (2006.01)
G02B 5/08 (2006.01)
G02B 17/00 (2006.01)

(52) U.S. Cl.
CPC .............. G02C 7/022 (2013.01); A61B 3/12 (2013.01); G02B 17/006 (2013.01); A61B 3/102 (2013.01); G02B 5/08 (2013.01)

(58) Field of Classification Search
None
See application file for complete search history.

(56) References Cited

U.S. PATENT DOCUMENTS 5,142,387 A * 8/1992 Shikama ............... F21V 7/0025
349/67
9,256,060 B2 2/2016 Kobori
2016/0357025 A1* 12/2016 King ..................... F21S 43/145

FOREIGN PATENT DOCUMENTS

EP 883302 A2 * 12/1998 ........... G02B 27/283
EP 1059550 A1 * 12/2000 ......... G02B 17/0808
JP 2015-534482 A 12/2015
(Continued)

OTHER PUBLICATIONS

JP Office Action issued in corresponding Japanese Patent Application No. 2023-021922 dated Sep. 26, 2023 (6 pages).
(Continued)

*Primary Examiner* — William R Alexander
*Assistant Examiner* — Mackenzi Waddell
(74) *Attorney, Agent, or Firm* — Foley & Lardner LLP

(57) ABSTRACT

An optical system is capable observing a peripheral field away from a visual axis and includes a reflection mirror unit forming an image of an examined eye with two concave mirrors in an opposing arrangement facing each other at the examined eye side, this being the upstream side, of a first optical unit and a second optical unit. In the reflection unit there is a conjugate relationship between one focal point thereof and another focal point thereof. By forming an image of the examined eye using the reflection unit a distance can be secured between the examined eye and the optical system and a wide range of the examined eye can be observed.

12 Claims, 19 Drawing Sheets

(56) References Cited

FOREIGN PATENT DOCUMENTS

| | | | | |
|---|---|---|---|---|
| JP | 2016-065771 A | | 4/2016 | |
| JP | 2017169671 A | * | 9/2017 | |
| WO | WO-0102890 A1 | * | 1/2001 | ......... G02B 19/0023 |

OTHER PUBLICATIONS

Japanese Office Action for corresponding JP Appl. Ser. No. 2023-021922 dated Apr. 16, 2024 (3 pages).
JP Decision of Dismissal of Amendment issued in corresponding Japanese Appl. Ser. No. 2023-021922 Dated Nov. 5, 2024 (3 pages).
JP Decision of Refusal issued in corresponding Japanese Appl. Ser. No. 2023-021922 Dated Nov. 5, 2024 (2 pages).

\* cited by examiner

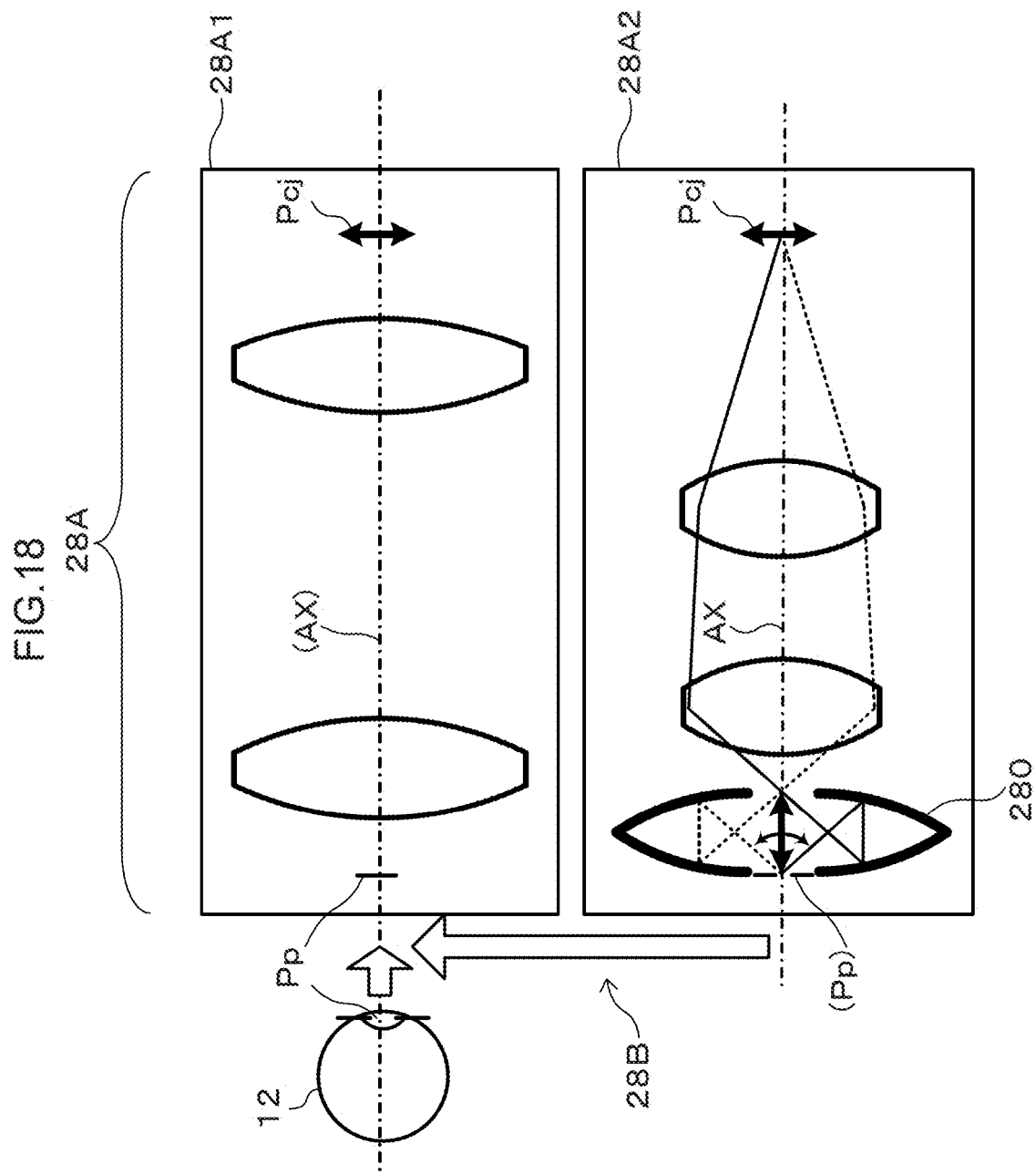

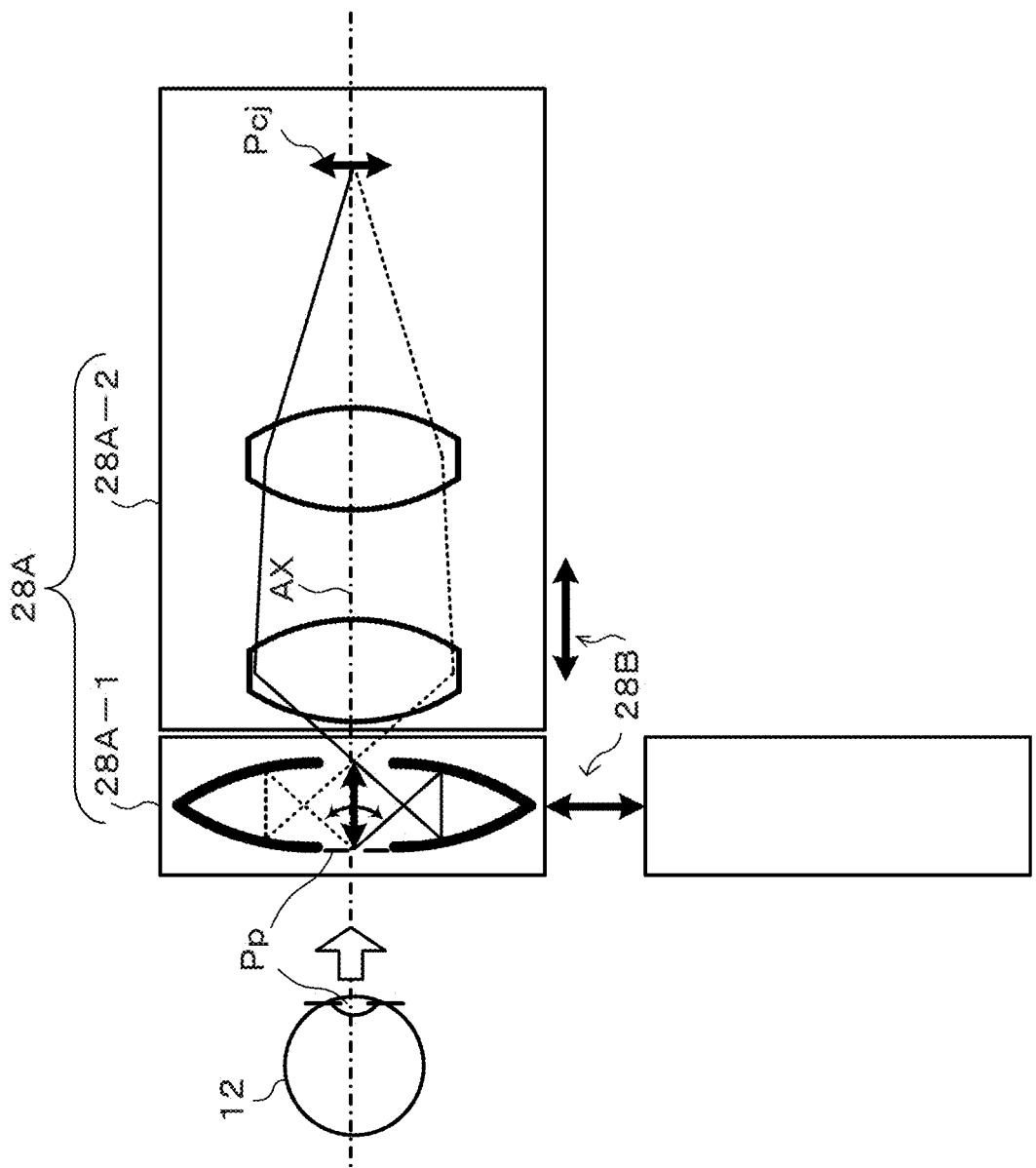

OPHTHALMIC OPTICAL SYSTEM, OPHTHALMIC DEVICE, AND OPHTHALMIC SYSTEM

CROSS-REFERENCE TO RELATED APPLICATIONS

This application is a continuation application of International Application No. PCT/JP2019/006608, filed Feb. 21, 2019, the disclosure of which is incorporated herein by reference in its entirety. Further, this application claims priority from Japanese Patent Application No. 2018-031110, filed Feb. 23, 2018, the disclosure of which is incorporated herein by reference in its entirety.

TECHNICAL FIELD

Technology disclosed herein relates to an ophthalmic optical system, an ophthalmic device, and an ophthalmic system.

BACKGROUND ART

Ophthalmic devices are implemented for performing ophthalmic diagnosis, ophthalmic surgical treatment, and the like. A recent desire is for an ophthalmic device capable of observing the fundus of an eye of a subject (hereafter referred to as examined eye) over a wide range. A wide-angled optical system is utilized to obtain fundus images with a wide field of view. When a wide-angled optical system is configured from lenses alone, the lens diameter becomes large in order to secure a working distance between the examined eye and the objective lens. As a result thereof, a wide-angled optical system becomes bulky, leading to an increase in weight and an increase in manufacturing cost. Moreover, aberration correction is complicated in cases in which large diameter lenses are employed in an attempt to obtain high resolution images with a wide field of view. There is accordingly demand for an ophthalmic device equipped with a wide-angled optical system capable of obtaining wide-angled images of the fundus at a high resolution, while having a simple configuration.

Patent Document 1 and Patent Document 2 disclose ophthalmic devices equipped with optical systems for acquiring wide-angled images of the fundus.

RELATED ART DOCUMENTS

Patent Documents

Patent Document 1: Japanese Patent Application Laid-Open (JP-A) No. 2017-169671
Patent Document 2: JP-A No. 2015-534482

SUMMARY OF INVENTION

An ophthalmic optical system according to a first aspect of the technology disclosed herein includes a reflection unit including a first concave mirror and a second concave mirror: and a lens unit configured to receive light from the reflection unit, wherein: the first concave mirror and the second concave mirror of the reflection unit each include an aperture on an optical axis and have an opposing arrangement to each other in which at least one of a focal point of the first concave mirror or a focal point of the second concave mirror is positioned at the aperture of the other concave mirror, and in which light rays from the focal point of the first concave mirror are reflected by the first concave mirror and the second concave mirror so as to converge as light toward the focal point of the second concave mirror, and the lens unit includes an angle conversion lens that is arranged at a position of the aperture of the first concave mirror which is furthest toward an examined eye side of the lens unit, and that converts an angle of wide-angled converging light from the reflection unit to a smaller angle.

An ophthalmic device according to a second aspect of the technology disclosed herein includes a light source configured to emit light of a prescribed wavelength, the ophthalmic optical system, a scanning member arranged at a position conjugate to a pupil of the lens unit and configured to scan light from the light source toward an examined eye through the lens unit and the reflection unit, and an imaging section configured to image a fundus of the examined eye with light scanned by the scanning member.

An optical system according to a third aspect of the technology disclosed herein includes a first acquisition section configured to acquire a first image of a near-axis region where the fundus of the examined eye imaged by the ophthalmic device and the optical axis intersect, a second acquisition section configured to acquire a second image of a ring-shaped region of the fundus of the examined eye at a periphery of the near-axis region, and a forming section configured to combine the first image acquired by the first acquisition section and the second image acquired by the second acquisition section to form a wide image of the examined eye.

BRIEF DESCRIPTION OF DRAWINGS

FIG. 18 is a schematic diagram illustrating an example of an optical system according to a fifth exemplary embodiment.

FIG. 19 is a schematic diagram illustrating an example of a system employed to mount/demount an optical module according to the fifth exemplary embodiment.

DESCRIPTION OF EMBODIMENTS

Explanation follows regarding exemplary embodiments, with reference to the drawings.

First Exemplary Embodiment

Figure 1:
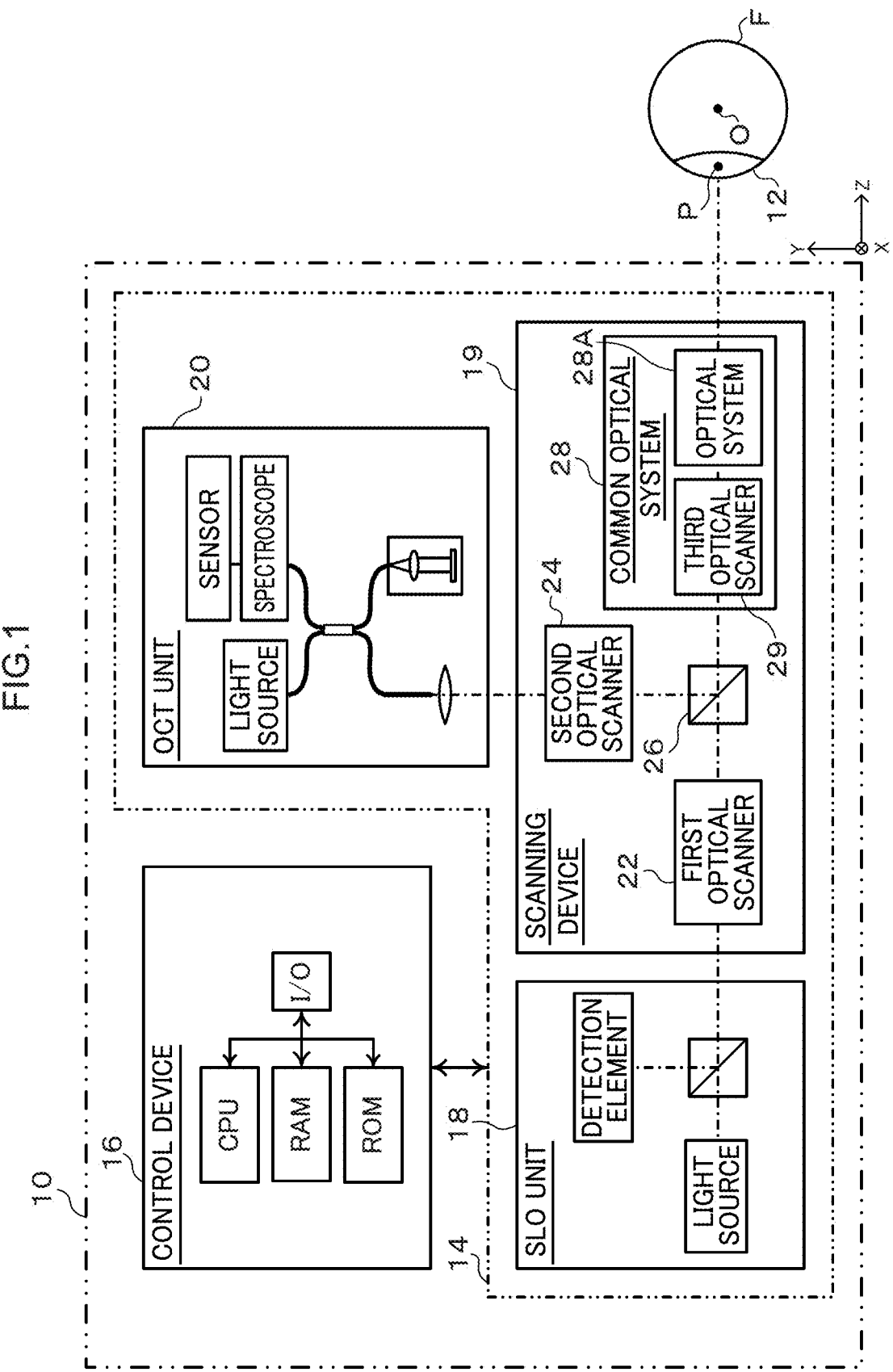
FIG. 1 is a block diagram illustrating an example of an overall configuration of an ophthalmic device according to a first exemplary embodiment.

FIG. 1 is an example of a configuration of an ophthalmic device 10 according to the present exemplary embodiment. The ophthalmic device 10 includes an imaging device 14 for imaging an examined eye 12, and a control device 16 for controlling the imaging device 14. The imaging device 14 includes as imaging functions an SLO unit 18 and an OCT unit 20. The SLO unit 18 functions as a scanning laser ophthalmoscope (hereafter referred to as "SLO"). The OCT unit 20 functions as an optical coherence tomography (OCT) device (hereafter referred to as "OCT"). The control device 16 exchanges information with the imaging device 14 so as to control the operation thereof. The control device 16 generates SLO images based on signals detected by the SLO unit 18. The control device 16 generates OCT images based on signals detected by the OCT unit 20. The control device 16 is, for example, implemented by a computer including a central processing unit (CPU), ROM, and random access memory (RAM), however there is no limitation thereto, and the control device 16 may be implemented by another hardware configuration. In the following an example will be illustrated in which a posterior segment of the eye, and in particular the fundus, is employed as the observation subject, however there is no limitation thereto, and an anterior eye segment may be employed therefor. The cornea is an example of such an anterior eye segment.

In the following description, when the ophthalmic device 10 is installed on a horizontal plane, the "X direction" corresponds to a horizontal direction and the "Y direction" corresponds to a direction perpendicular to the horizontal plane. A direction connecting the anterior segment of the examined eye 12 to the fundus through the center of the eyeball is referred to as the "Z direction".

The acquisition of SLO images is realized by the SLO unit 18 including a light source and sensor, a scanning device 19 including optical scanners, and the control device 16 for control thereof. Specifically, light emitted from the SLO unit 18 (hereafter referred to as "SLO light") is illuminated onto a fundus F through the scanning device 19 and a pupil P of the examined eye 12. The scanning device 19 includes a first scanner 22 (Y direction) and a third scanner 29 (X direction) as optical scanners to scan the SLO light. The SLO light emitted from the SLO unit 18 is accordingly scanned in two dimensions by the scanning device 19. Reflected light that has been reflected by the fundus F is incident to the SLO unit 18 through the pupil P and the scanning device 19. The sensor of the SLO unit 18 generates a signal according to the reflected light, and outputs the signal to the control device 16. The control device 16 generates an SLO image of the fundus F based on the detection signal by the sensor. Note that SLO is a known imaging function, and so detailed explanation thereof will be omitted.

Acquisition of an OCT image, for example, a fundus OCT image, is implemented by the OCT unit 20 including a light source, reference optical system, interferometer, spectroscope, and sensors, the scanning device 19 including optical scanners, and the control device 16 for control thereof. Specifically, light emitted from the light source is split in the OCT unit 20 into reference light that is incident to the reference light optical system, and measurement light that is incident to the scanning device 19. The measurement light is illuminated onto the fundus F through the scanning device 19 and the pupil P. The scanning device 19 includes a second scanner 24 (Y direction) and the third scanner 29 (X direction) as optical scanners to scan the measurement light. Thus the measurement light emitted from the OCT unit 20 is scanned in two dimensions by the scanning device 19. The measurement light reflected by the fundus F is incident to the OCT unit 20 through the pupil P and the scanning device 19. The interferometer of the OCT unit 20 causes the measurement light to interfere with the reference light to generate interference light. The respective spectral components of the interference light split by the spectroscope are detected by the sensors. The signals detected by the sensors are input to the control device 16. The control device 16 generates an OCT image of the fundus F based on the detection signals. Note that although in the present exemplary embodiment a spectral domain OCT (SD-OCT) is given as an example of the OCT unit 20, there is no limitation thereto. Another type of OCT, such as for example a swept source OCT (SS-OCT) may be adopted instead of SD-OCT. Note that OCT is a known imaging function, and so detailed explanation thereof will be omitted.

In the following description, SLO light and OCT measurement light will be collectively referred to as scanning light, unless there is a need to discriminate between the SLO light and the OCT measurement light. Moreover, an optical system 28A configuring a common optical system 28 is not limited to case in which the optical system 28A functions as an optical system common to both the SLO and the OCT as illustrated in FIG. 1. Obviously a configuration may be adopted in which optical systems are independently employed for SLO use or OCT use in the SLO device or the OCT device.

Figure 2:
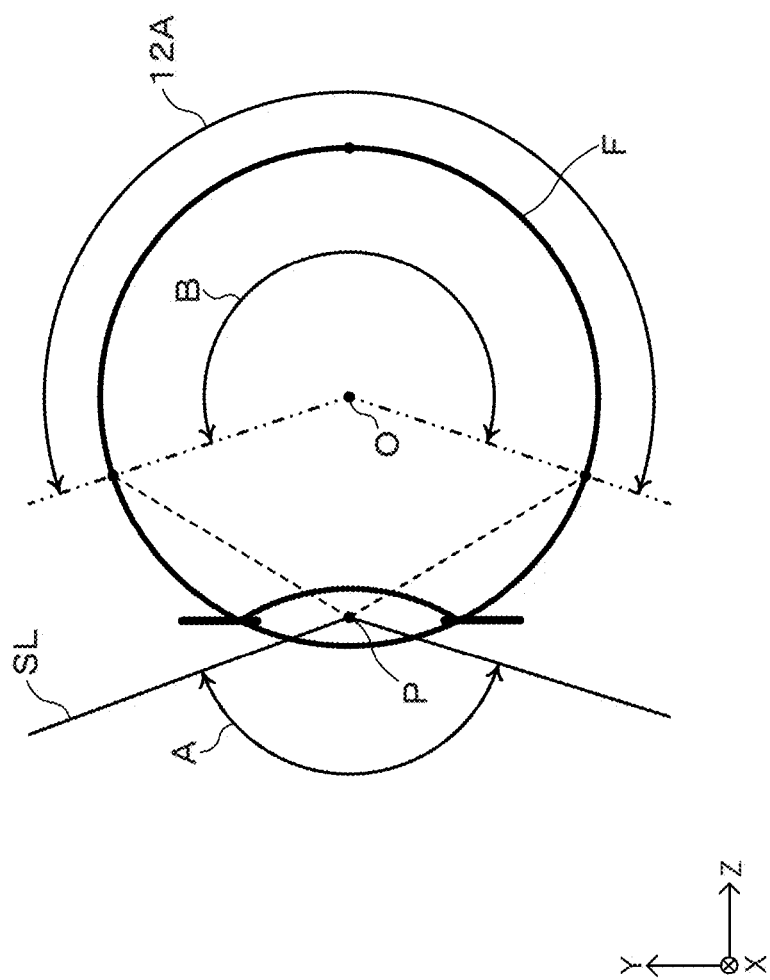
FIG. 2 is a diagram illustrating an example of illumination angles with respect to an examined eye for an ophthalmic device according to the first exemplary embodiment.

Next, description follows regarding a relationship between a scanning angle of scanning light with respect to the examined eye 12, and an imaging range on the fundus. As illustrated in FIG. 2, a scanning angle A of scanning light SL with reference to the position of the pupil P (hereafter referred to as external scanning angle A) corresponds to a field of view (FOV) 12A of the observer. The larger the scanning angle A, the larger the field of view 12A. Note that although the scanning light SL is in practice refracted by the cornea, a state is schematically illustrated in FIG. 2 in which the scanning light SL appears to be being refracted at the center of the pupil P.

The field of view 12A may also be defined by a scanning angle B (hereafter referred to as internal scanning angle B). The internal scanning angle B is a scanning angle of the scanning light SL as with reference to a position of the eyeball center O. Although the reference positions for the external scanning angle A and the internal scanning angle B are different, they hold a correspondence relationship to each other. In the following description the external scanning angle A is employed as the scanning angle corresponding to the field of view 12A. Note that the field of view 12A realized by the ophthalmic device 10 equipped with the optical system 28A serving as a wide-angled optical system is, for example, an external illumination angle A of approximately 120°, which is equivalent to an internal illumination angle B of approximately 160°. Note that in a conventional ophthalmic device lacking a wide-angled optical system the external illumination angle A is, for example, approximately 45°, which is equivalent to an internal illumination angle B of approximately 60°.

The external illumination angle A is, as described above, a field of view A, namely, corresponds to the imageable range on the fundus. Thus in the following description, field of view 12A is referred so as imaging range 12A. A user is able to set a freely chosen imaging position and imaging region in the imaging range 12A by controlling the scanning angles in the scanning device 19.

Next, description follows regarding the SLO optical system and the OCT optical system. As illustrated in FIG. 1, the SLO optical system is configured from the SLO unit 18 and the scanning device 19. The OCT optical system is configured from the OCT unit 20 and the scanning device 19. The scanning device 19 includes the first optical scanner 22, the second optical scanner 24, and the third optical scanner 29 reflection unit 280 as optical scanners for scanning light scanning. The scanning device 19 also includes the common optical system 28. The third optical scanner 29 is included in the common optical system 28 employed commonly in both the SLO optical system and the OCT optical system. The common optical system 28 also includes the optical system 28A serving as a wide-angled optical system. The scanning light emitted from the third optical scanner 29 is incident to the examined eye 12 through the optical system 28A. The scanning device 19 also includes a dichroic mirror 26. The dichroic mirror 26 is disposed between the first optical scanner and the third optical scanner. The SLO light emitted from the first optical scanner 22 is guided to the third optical scanner 29 through the dichroic mirror 26. The OCT measurement light emitted from the second optical scanner 24 is guided to the third optical scanner 29 via the dichroic mirror 26. The optical path length between the first optical scanner 22 and the dichroic mirror 26 is matched to the optical path length between the second optical scanner 24 and the dichroic mirror 26. The first optical scanner 22, the second optical scanner 24, and the third optical scanner 29 are arranged so as to be at conjugate positions to the center of the pupil P. The dichroic mirror 26 may, as described above, be included in the common optical system 28 so as to be commonly employed in the SLO optical system and the OCT optical system.

Examples of optical scanners include polygon mirrors, galvanometer mirrors, and the like. Polygon mirrors, galvanometer mirrors, or a combination thereof may be employed for the optical scanners 22, 24, 29. The optical scanners 22, 24, 29 are not limited to being polygon mirrors and galvanometer mirrors, and any deflecting optical element for deflecting scanning light in a prescribed direction may be employed therefor.

Namely, there is a requirement in the ophthalmic device 10 to image a wide range in the imaging range 12A of the fundus in the examined eye 12. However, in cases in which the optical system 28A is configured using lenses alone, it is difficult to achieve an ultrawide angle for the external illumination angle A on the examined eye 12 an obtain a wider field of view. This is because there are plural problems that need solving: securing a working distance between the examined eye 12 and the surface of the optical system closest to the examined eye 12; improving aberration performance to obtain high resolution images; suppressing flaring and ghosting; reducing the size and weight of device body; and reducing the difficulty and cost of manufacture. These problems are sometimes mutually exclusive in a drive to obtain a wider angle field of view.

There is accordingly, as described above, a demand for an ophthalmic device capable of observing the fundus F over a wide range. In such cases, there is a need to achieve a wider angle of external scanning angle A than in conventional ophthalmic devices in order to obtain a large imaging range 12A. Thus the ophthalmic device 10 includes the optical system 28A serving as a wide-angled optical system in order to implement a wide-angled external scanning angle A. The optical system 28A is included in the common optical system 28, and is common to both the SLO optical system and the OCT optical system. This accordingly enables wide-angled SLO images and wide-angled OCT images to be acquired with the ophthalmic device 10 equipped with the optical system 28A.

Figure 3:
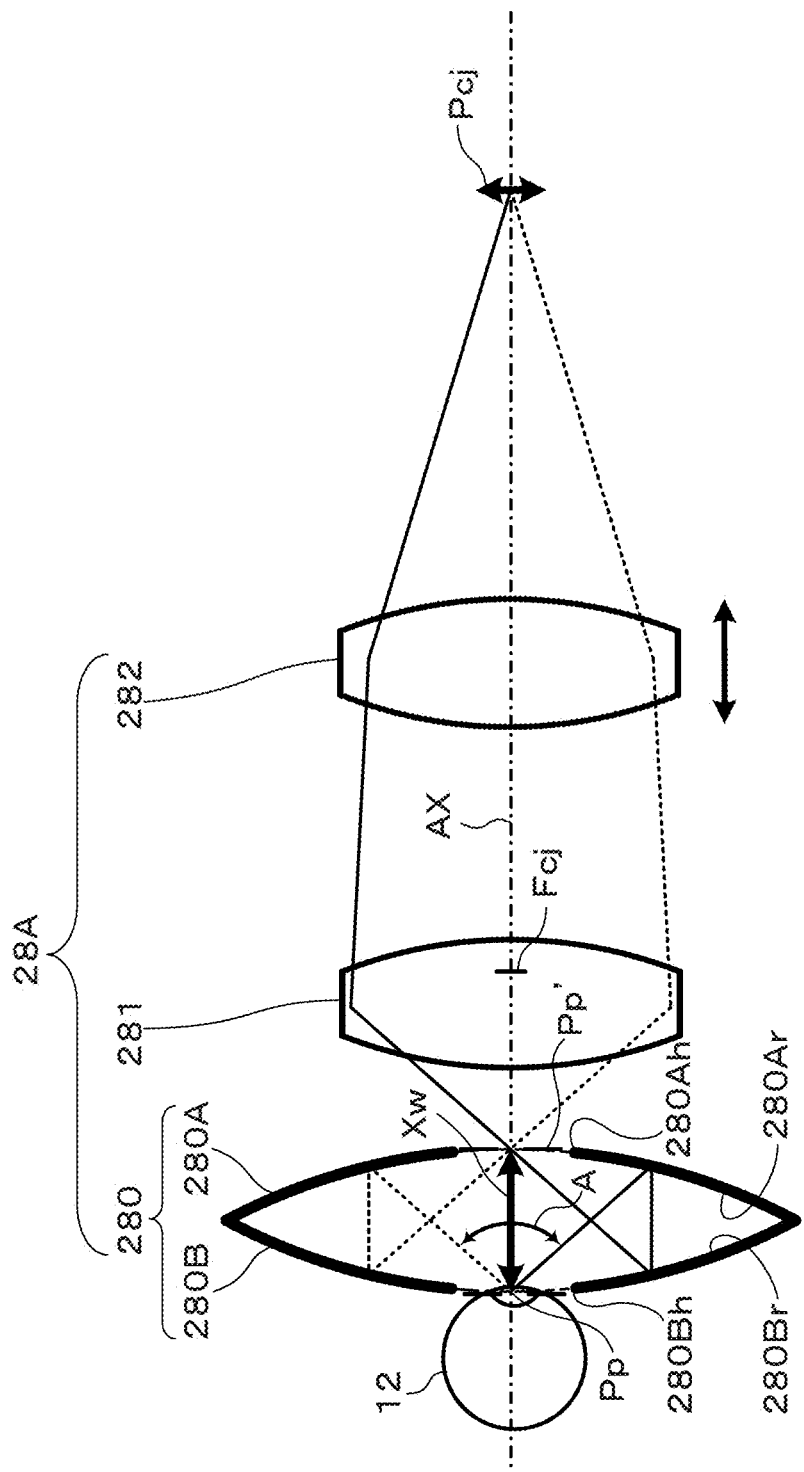
FIG. 3 is a schematic diagram of an optical system in a common optical system included in an ophthalmic device according to the first exemplary embodiment.

As illustrated in FIG. 3, the optical system 28A includes, in sequence from the examined eye 12 side, a reflection unit 280 to relay the image of the examined eye 12, and connected at the rear thereof, a first lens group 281 serving as a lens unit and a second lens group 282. The reflection unit 280 includes a pair of concave mirrors, and relays an image of the pupil Pp of the examined eye 12. A first concave mirror 280A and a second concave mirror 280B configuring the pair of concave mirrors are configured, as described later, so that their focal points have a same-size conjugate relationship without aberration to each other. A conjugate image of the pupil Pp of the examined eye 12 disposed in the vicinity of an aperture 280Bh of the second concave mirror 280B on the examined eye side is accordingly formed in the vicinity of an aperture 280Ah of the first concave mirror 208A on the opposite side to the examined eye side. An image Pp' of the pupil Pp formed in the vicinity of the aperture 280Ah of the first concave mirror 280A is a relayed image of the pupil Pp in the vicinity of the aperture 280Bh relayed by the reflection unit 280. Thus the position of the pupil Pp of the examined eye, and a conjugate position of the pupil formed by the reflection unit 280, are accordingly preferably matched to the respective focal point positions of the reflection surfaces 280A, 280B of the reflection unit 280. The pupil Pp of the examined eye is disposed in the vicinity of the focal point position of the first reflection mirror 280A, and a position of an incident pupil of a combined system of the first lens group 281 and the second lens group 282, namely of a lens unit, is arranged in the vicinity of the focal point position of the second reflection mirror 280B, namely at a position of the aperture 280Ah at the center of the first reflection surface 280A. The image Pp' of the pupil Pp relayed to the aperture 280Ah is formed, by the lens unit including the first lens group 281 including lenses of positive optical power and the second lens group 282 including lenses of positive optical power, into a pupil conjugate image Pcj at a position conjugate to the position of the pupil Pp of the examined eye in space at the opposite side thereof to the examined eye 12. Moreover, an example of a working distance between the examined eye 12 and the surface of the optical system closest to the examined eye 12 is indicated in the example of FIG. 3 as distance Xw, between the examined eye 12, and a reflection surface 280Ar of the first concave mirror 280A, which is the first optical element reached by light rays propagating toward the examined eye 12.

Note that the first concave mirror 280A and the second concave mirror 280B configuring the pair of concave mirrors have, as described later, respective concave reflection surface which may, for example, be reflection mirrors with concave parabolic reflection surfaces. In the present specification these are sometimes referred to simply as reflection mirrors or reflection surfaces.

Moreover, the reflection surfaces of the first concave mirror 280A and the second concave mirror 280B are not limited to being parabolic reflection surfaces, and they may be aspherical surfaces formed with rotational symmetry with the optical axis at the center.

The first lens group 281 out of the lens units is equipped with a lens to catch the wide-angled light beam from the reflection unit 280. This lens is a lens (hereafter referred to as an angle conversion lens) to convert the respective angles of the wide-angled rays of light from the examined eye 12 to angles that are smaller than the angles of the wide-angled rays of light. The image Pp' of the pupil Pp of the examined eye formed in the vicinity of the aperture 280Ah of the first reflection mirror 280A is a spatial image, enabling a lens to be disposed adjacent to this image. Furthermore, a lens may also be provided within the spatial image of the pupil Pp. This accordingly enables the diameter of the angle conversion lens for accepting the wide-angled light beam to be made smaller in the first lens group 281. As a result the lens disposed on the examined eye side of the first lens group 281 may be an angle conversion lens having a small diameter. Due to the angles of the wide-angled light beam handled by the reflection unit 280 being converted to smaller angles by this lens, the overall diameter of the first lens group 281 can be made smaller. Due to having a smaller lens diameter for the first lens group 281, the diameter of the second lens group 282 can also be smaller. The optical system 28 equipped with the reflection unit 280 accordingly enables good correction of various aberrations while having a lens unit with a simple lens configuration, thereby enabling excellent quality ultrawide-angled images of the fundus to be acquired.

The scanning light SL illuminated onto the fundus F through the pupil P of the reflection unit 280 is, as illustrated in FIG. 3, reflected by the fundus F and incident as reflected light to the reflection unit 280. The reflected light is incident through the reflection unit 280 to the lens unit configured by the first lens group 281 and the second lens group 282. The reflected light is, as illustrated in FIG. 1, also incident to the SLO unit 18 through the third optical scanner 29 and the first optical scanner 22. The control device 16 generates a wide-angled image of the fundus F based on signals detected by sensors.

Note that in the optical system 28A, a position where a fundus conjugate image Fcj having a conjugate relationship to the fundus F is formed is substantially at the center of the first lens group 281, or in the vicinity thereof. In the first lens group 281 and the second lens group 282, which are disposed between the pupil Pp of the examined eye and a position of a pupil conjugate position image Pcj having a conjugate relationship thereto, in order to correct aberration, it is effective for these lens groups to include at least one surface having a negative optical power. Pupil coma aberration between the pupil Pp and the pupil conjugate image Pcj results in angular differences at the light beam plane of the fundus image at the image position of the pupil conjugate Pcj, leading to changes in resolution power according to fundus position. In order to correct such coma aberration, preferably a lens group having an overall positive optical power is disposed between a fundus conjugate Fcj position conjugate to the fundus of the examined eye 12, and the pupil conjugate Pcj position, with at least one surface in this lens group being configured by a surface having a negative optical power. Moreover, when fine focal point adjustment to the examined eye is required for the ophthalmic device, preferably some of the optical elements are able to be moved along the optical axis. In the present exemplary embodiment, the second lens group 282, which is the lens group on the opposite side to the examined eye side in the lens unit, is able to be moved along the optical axis.

Next, description follows regarding details of the reflection unit 280. The reflection mirror unit 280 includes the pair of concave mirrors 280A, 280B, as illustrated in FIG. 3. Each of the concave mirrors 280A, 280B is formed as a parabolic mirror, with the focal length of both concave mirrors the same as each other, and the separation between the two concave mirrors on the optical axis matching the focal length. The concave mirrors 280A, 280B respectively include the central apertures 280Ah, 280Bh containing an intersection point with the optical axis of the reflection unit, and are respectively configured by donut shaped ring reflection sections. The two concave mirrors 280A, 280B have an opposing arrangement so as to face each other. Adopting such an arrangement means that light incident from the central aperture 280Ah on the one reflection surface 280A side is reflected by the other reflection surface 280B before being reflected by the one reflection surface 280A toward the central aperture 280Bh of the other reflection surface 280B. In particular, due to the concave mirrors 280A, 280B being parabolic surfaces, light rays emitted from the focal point are reflected as light rays parallel to the optical axis, and light parallel to the optical axis is converged at the focal points. Thus by the opposing arrangement of the two concave mirrors having reflection surfaces that are parabolic surfaces so as to face each other at a separation of their mutual focal lengths, an image of an object positioned at the central aperture of one of the reflection surface can be formed in the central aperture of the other reflection surface. Namely, when the pupil Pp of the examined eye 12 is positioned at the aperture 280Bh, the image Pp' of the pupil Pp is relayed to the position of the aperture 280Ah. When the vicinity of the aperture 280Ah is observed from the first reflection surface 280A side in this state, the pupil P is observed as if it is standing out. The image of the pupil Pp relayed by the reflection unit 280 may then be handled similarly to the pupil Pp itself.

In the configuration of the optical system illustrated in FIG. 3, the aperture 280Ah of the first concave mirror 280A and the aperture 280Bh of the second concave mirror 280B may be formed as physical aperture spaces (holes) formed at the centers of the respective reflection surfaces; however, in order to prevent the ingress of foreign bodies and dust into the space between the pair of concave mirrors, they may be formed by a transparent sheet formed at a central portion of the concave mirrors. In particular, the aperture 280Ah of the first reflection mirror 280A disposed on the opposite side to the examined eye may, as described above, be formed as a transparent sheet by adopting a configuration in which the final lens at the leading end of the lens unit (the angle conversion lens) is fitted therein, or the angle conversion lens is bonded thereto.

Moreover, the apertures formed in the concave mirrors are not limited to being aperture shaped as long as there are formed in such a manner that enables light to pass through. Generally the shape of the apertures is a circular shape, however they may be formed in an elliptical shape, polygonal shape, asymmetrical shape, or the like. The size of the apertures is preferably as small as possible as they shield a region on the optical axis of the reflection unit. However, if the central aperture of the second concave mirror 280B on the examined eye side is too small then the face of the person whose eye is being examined will contact the concave mirror, and so the central aperture needs to be sufficiently large to avoid such contact. Moreover, the central aperture of the concave mirror 280A on the opposite side to the examined eye is essential for guiding light emitted from the reflection unit 280 into subsequent lens units, and so the size thereof is determined to balance the size of central shielding therein.

Figure 4:
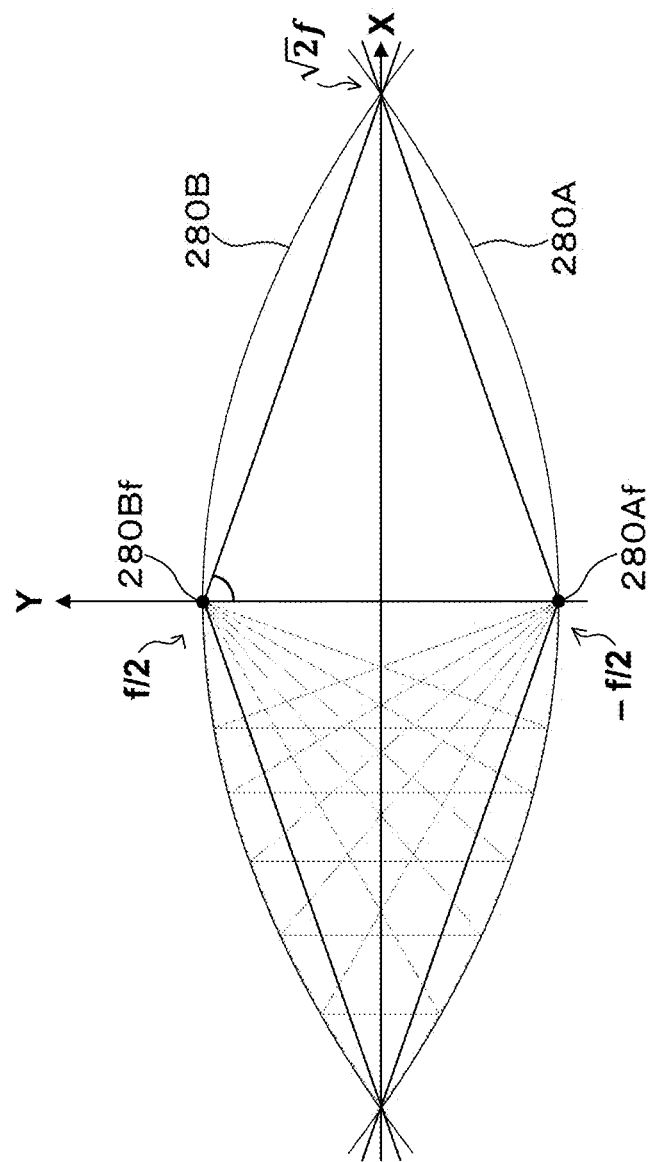
FIG. 4 is a schematic diagram illustrating an example of a reflection mirror unit according to the first exemplary embodiment.

From out of the pair of concave mirrors configuring the reflection unit 280, the concave mirror 280A includes a parabolic surface having a focal length f as the first reflection surface 280A, as illustrated in FIG. 4. Moreover, the concave mirror 280B includes a parabolic surface having a focal length f as the second reflection surface 280B. The two concave mirrors 280A, 280B are arranged such that the focal point on the first reflection surface 280A is superimposed with the apex of the second reflection surface 280B. The focal points of the concave mirrors are thereby aligned with each other, and by adopting a configuration in which the concave mirrors have an opposing arrangement so as to oppose each other at a separation of the focal length, the focal points have a same-size conjugate relationship to each other without aberration. The example illustrated in FIG. 4 illustrates an example of a case in which a focal point 280Af of the first reflection surface 280A is superimposed on the apex of the second reflection surface 280B (for example, the center of the second reflection surface 280B), and a focal point 208Bf of the second reflection surface 280B is superimposed on the apex of the first reflection surface 280A (for example, the center of the first reflection surface 280A).

Extending the reflection surfaces of the first reflection surface 280A and the second reflection surface 280B to their mutual intersections, uniquely determines a maximum half angle C enabling reflection by both the first reflection surface 280A and the second reflection surface 280B, which is approximately 70.5°. The first reflection surface 280A is expressed by the following Equation (1), wherein the x axis is a straight line passing through the intersection points between the first reflection surface 280A and the second reflection surface 280B, and the y axis is a straight line passing through the apex of the first reflection surface 280A and the apex of the second reflection surface 280B. Moreover, the second reflection surface 280B is expressed by the following Equation (2). Due to the opposing arrangement of the two concave mirrors 280A, 280B having parabolic surfaces with an object arranged at one reflection surface side, an image of the object is accordingly formed at the other reflection surface side. In the present exemplary embodiment, the reflection unit 280 is employed to observe the examined eye 12.

$$y = -x^2/4f + f/2 \quad \text{Equation (1)}$$

$$y = +x^2/4f + f/2 \quad \text{Equation (2)}$$

Figure 5:
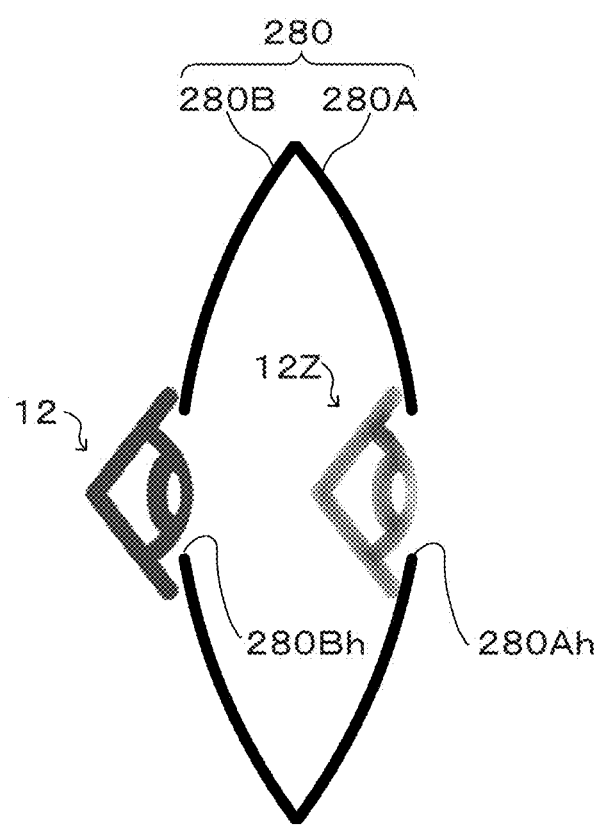
FIG. 5 is a schematic diagram illustrating a state in which an image of an examined eye is formed by a reflection mirror unit according to the first exemplary embodiment.

FIG. 5 schematically illustrates a state in which an image of the examined eye 12 is formed by the reflection unit 280 according to the present exemplary embodiment. In the reflection unit 280, the central apertures 280Ah, 280Bh are respectively provided to the first reflection surface 280A and the second reflection surface 280B, and when the examined eye 12 is positioned at the aperture 280Bh of the second reflection surface 280B, an image 12Z of the examined eye 12 is formed in the vicinity of the aperture 280Ah of the first reflection surface 280A. In the state illustrated in FIG. 5, when the examined eye 12 is observed from the outside of the reflection unit 280 (the right side in the drawing) at the vicinity of the aperture 280Ah of the first reflection surface 280A, the examined eye 12 is observed as if it is standing out. The image 12Z of the examined eye 12 formed by the reflection unit 280 can be handled similarly to the examined eye 12 itself. Namely, due to the spatial image of the examined eye being formed at the aperture 280Ah by the reflection unit 280, an optically sufficient distance Xw is secured.

Figure 6:
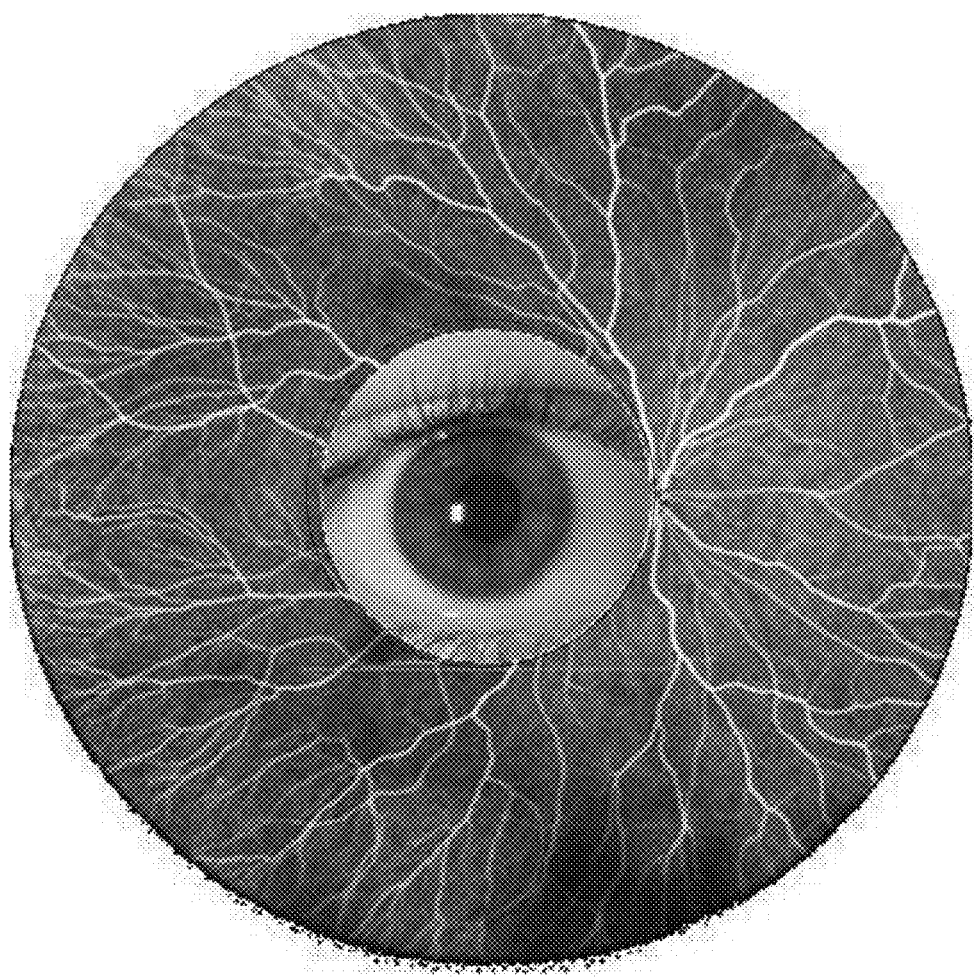
FIG. 6 is a diagram illustrating an example of an observation image of an examined eye imaged by an optical system according to the first exemplary embodiment.

Next an example will be given of a wide-angled image of the fundus F imaged using the optical system 28A as illustrated in FIG. 6 (hereafter also referred to as wide-angled SLO image). The reflected light reflected at the fundus F is incident to the first lens group 281 and the second lens group 282 through the reflection unit 280, as illustrated in FIG. 3. This reflected light is moreover incident to the SLO unit 18 via the first optical scanner 22, as illustrated in FIG. 1, and a wide-angled image of the fundus F is generated by the control device 16. Some of the reflected light from out of the reflected light passing through the aperture 280Ah of the reflection unit 280, namely near-axis light in directions substantially along optical axis AX, is emitted to the first lens group 281 without being reflected by the reflection unit 280. Thus, as illustrated in FIG. 6, a fundus image is not depicted at a central portion of the wide-angled image, namely a central region corresponding to the apertures 280Ah, Bh. For example, a blurred image of an anterior segment of the eye, is formed in the region corresponding to the apertures 280Ah, Bh. The light from the examined eye passing through this central aperture can be formed into an image of the anterior eye segment by the lens unit due to being incident to a lens unit without interacting with the reflection unit 280. Although the position of this image does not match the position of the fundus image, there is a significantly deep focal depth due to being formed as an image by the near-axis light rays, enabling a picture of the anterior eye segment, although slightly blurred, to be obtained for use with alignment of the examined eye.

Note that the size of the central region where the fundus image is not depicted is a size depending on the diameter of the as apertures 280Ah, 280Bh. From the perspective of making the central region where the fundus image is not depicted small, the effective diameters of the apertures 208Ah, Bh provided to the respective reflection surfaces of the reflection unit 280 are preferably as small as possible. For example, by determining the effective diameter of the apertures 208 as a diameter approximately matching the size of the pupil of the examined eye 12, or a diameter so as to include this size, the central portion of the examined eye 12 where a retinal image is difficult to acquire can be made to be a minimal region.

Example 1

Figure 7:
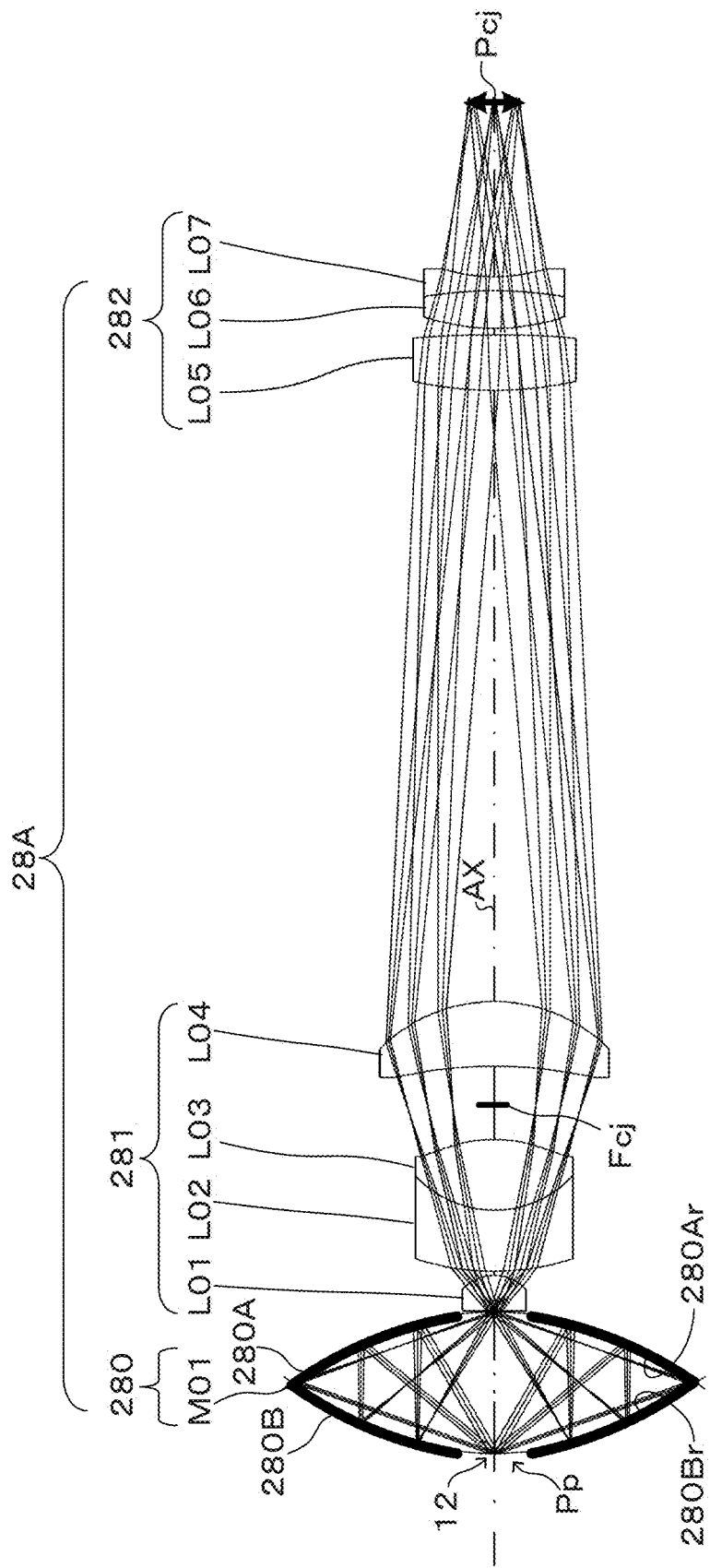
FIG. 7 is a configuration diagram illustrating an example of a configuration of an optical system according to Example 1.

Next, description follows regarding the optical system 28A according to an Example 1, with reference to FIG. 7.

The same reference numerals are appended to similar configuration to in the first exemplary embodiment, and detailed explanation thereof will be omitted.

The light rays illustrated in FIG. 7 illustrate a way in which a pupil conjugate point Pcj is formed by the optical system 28A in space at the opposite side to the examined eye 12 side. The optical system 28A includes, in sequence from the examined eye 12 side, the reflection unit 280, the first lens group 281, and the second lens group 282. The reflection unit 280 includes mirror module M01 having a second reflection surface 280Br and a first reflection surface 280Ar arranged in sequence from the pupil Pp side of the examined eye 12. The first lens group 281 includes, in sequence from the pupil Pp side, a positive meniscus lens L01 serving as the angle conversion lens and having a concave surface facing toward the pupil Pp side, a negative meniscus lens L02 having a convex surface facing toward the pupil Pp side, a double convex positive lens L03, and a positive meniscus lens L04 having a concave surface facing toward the pupil Pp side. The positive lens L01 is disposed so that the surface on the pupil Pp side thereof is adjacent to the image of the pupil Pp formed in the vicinity of the aperture 280Ah of the reflection surface 280A. The negative meniscus lens L02 and the double convex positive lens L03 are bonded together to configure a stuck together positive lens component including an aspherical surface at a surface on the opposite side to the pupil Pp. Moreover, the second lens group 282 includes, in sequence from the pupil Pp side, a positive lens L05, a double convex positive lens L06, and a double concave negative lens L07. The double convex positive lens L06 and the negative lens L07 are bonded together to form a meniscus lens component with a convex surface toward the pupil Pp side. Note that all of these optical elements are arranged along a single optical axis AX.

The positive lens L01 disposed furthest to the pupil Pp side in the first lens group 281 functions as the angle conversion lens. Namely, the lens surface on the pupil Pp side thereof is disposed slightly away from the vicinity of the position of converging light due to the reflection unit 280, namely the vicinity of the focal point of the second parabolic surface mirror 280B. The surface on the pupil Pp side of the positive lens L01 is either a flat surface or a slightly concave surface, and due to having a strong positive optical power on the opposite side to the pupil Pp, the extremely wide-angled light that has been reflected by the two parabolic surfaces in the reflection unit 280 is converted into light having a smaller emission angle. Thus by employing the positive lens L01 as the angle conversion lens, the diameters of the first lens group 281 and the second lens group 282 are clearly configured much smaller than the diameter of the reflection unit 280. Note that in cases in which a concave surface is employed for the surface on the pupil Pp side of the positive lens L01 serving as the angle conversion lens, a configuration may be adopted in which a central portion of the first concave mirror 280A has a transparent sheet as an aperture portion, and the positive lens L01 is bonded to this transparent sheet.

Parallel light beams emitted from the first lens group 281 becomes slightly divergent light and are incident to the subsequent second lens group 282. The second lens group 282 converts the weakly divergent light from the first lens group 281 into parallel light beams, and the conjugate image Pcj of the pupil Pp of the examined eye 12 is formed in the space on the opposite side to the examined eye 12 by configuration with the first lens group 281. Namely, an equivalent light beam to the parallel light beam emitted from the position of the pupil P of the examined eye 12 is emitted by the reflection unit 280, and the pupil conjugate point Pcj is formed through the first lens group 281 and the second lens group 282. In this example it is assumed that light from the fundus is emitted as a parallel light beam from the examined eye 12. In such cases a conjugate point to the fundus of the examined eye 12 is a position indicated by point Fcj in FIG. 7, and a primary spatial image Fcj of the fundus is formed between the optical elements of the first lens group 281 (between the lens L03 and the lens L04). Note that in the SLO unit 18 and the OCT unit 20 obviously the scanning light SL (laser beam) from each unit is incident to the examined eye 12 as a parallel light beam at various angles centered on the position of pupil P. Thereby the optical system 28A, as illustrated in FIG. 3, has the function of forming an image of the pupil Pp of the examined eye as the conjugate image Pcj, and has the function of a pupil relay system. The same applies in the following Examples.

Each lens surface of the lens elements described above may be imparted with improved image forming performance by employing appropriate aspherical surface profiles thereon. Such aspherical surfaces may be expressed by the following Equation (3), wherein r is a height in a direction perpendicular to the optical axis, z is a distance (sag) along the optical axis to a position on the aspherical surface at height r from a tangential plane to the apex of the aspherical surface, c is an inverse of apex radius of curvature, k is the conic constant, and the $n^{th}$ order aspheric coefficients are A, B, C, D, E, F, G, H, J.

$$z = (c \cdot r^2)/[1 + \{1 - (1+k) \cdot r^2 \cdot c^2\}^{1/2}] \\ + A \cdot r^4 + B \cdot r^6 + C \cdot r^8 + D \cdot r^{10} + E \cdot r^{12} \\ + F \cdot r^{14} + G \cdot r^{16} + H \cdot r^{18} + J \cdot r^{20}$$

Equation (3)

The following Table 1 lists values of the various factors of the optical system 28A in Example 1.

Table 1 illustrates a case in which the effective field of view (external illumination angle A from the pupil) is 140° (a pupil emission half angle of 70°), and the incident pupil diameter is 2 mm.

TABLE 1

| Surface No. | Optical Element | Radius of Curvature | Surface Separation | Refractive Index | Divergence |
|---|---|---|---|---|---|
| 1 (pupil plane) | | — | 30 | | |
| 2 (first reflection surface) | M01 | −60 | −30 | | |
| 3 (second reflection surface) | | 60 | 30.223132 | | |
| 4 | L01 | −93.4177 | 7.501708 | 1.5186 | 69.89 |

TABLE 1-continued

| Surface No. | Optical Element | Radius of Curvature | Surface Separation | Refractive Index | Divergence |
|---|---|---|---|---|---|
| 5 | | −9.00441 | 0.857758 | | |
| 6 | L02 | 52.50496 | 12.94518 | 1.78472 | 25.64 |
| 7 | L03 | 22.36621 | 14.99991 | 1.755 | 52.34 |
| 8 (aspheric surface) | | −27.6827 | 15.486 | | |
| 9 | L04 | −91.9634 | 13.69531 | 651600 | 58.57 |
| 10 | | −33.9101 | 129.5546 | | |
| 11 | L05 | 79.00236 | 11.6659 | 795040 | 28.69 |
| 12 | | −194.354 | 1.362656 | | |
| 13 | L06 | 46.77696 | 7.926765 | 568830 | 56 |
| 14 | L07 | −86.277 | 3 | 755200 | 27.57 |
| 15 | | 36.4755 | 38.0379 | | |
| 16 (pupil conjugate plane) | | | | | |

Note that at the mirror M01, the conic constant of the first reflection surface and the second reflection surface of respective surface Nos. 2, 3 is k=−1.

At the surface No. 8 the conic constant of lens L03 is k=0, and the aspheric coefficients are:

A: +0.415921E-05
B: +0.770893E-07
C: −0.228405E-09
D: +0.182991E-11
E: −0.558798E-14
F: −0.208417E-16
G: +0.119039E-18
H: +0.765206E-22
J: −0.681444E-24

Figure 8:
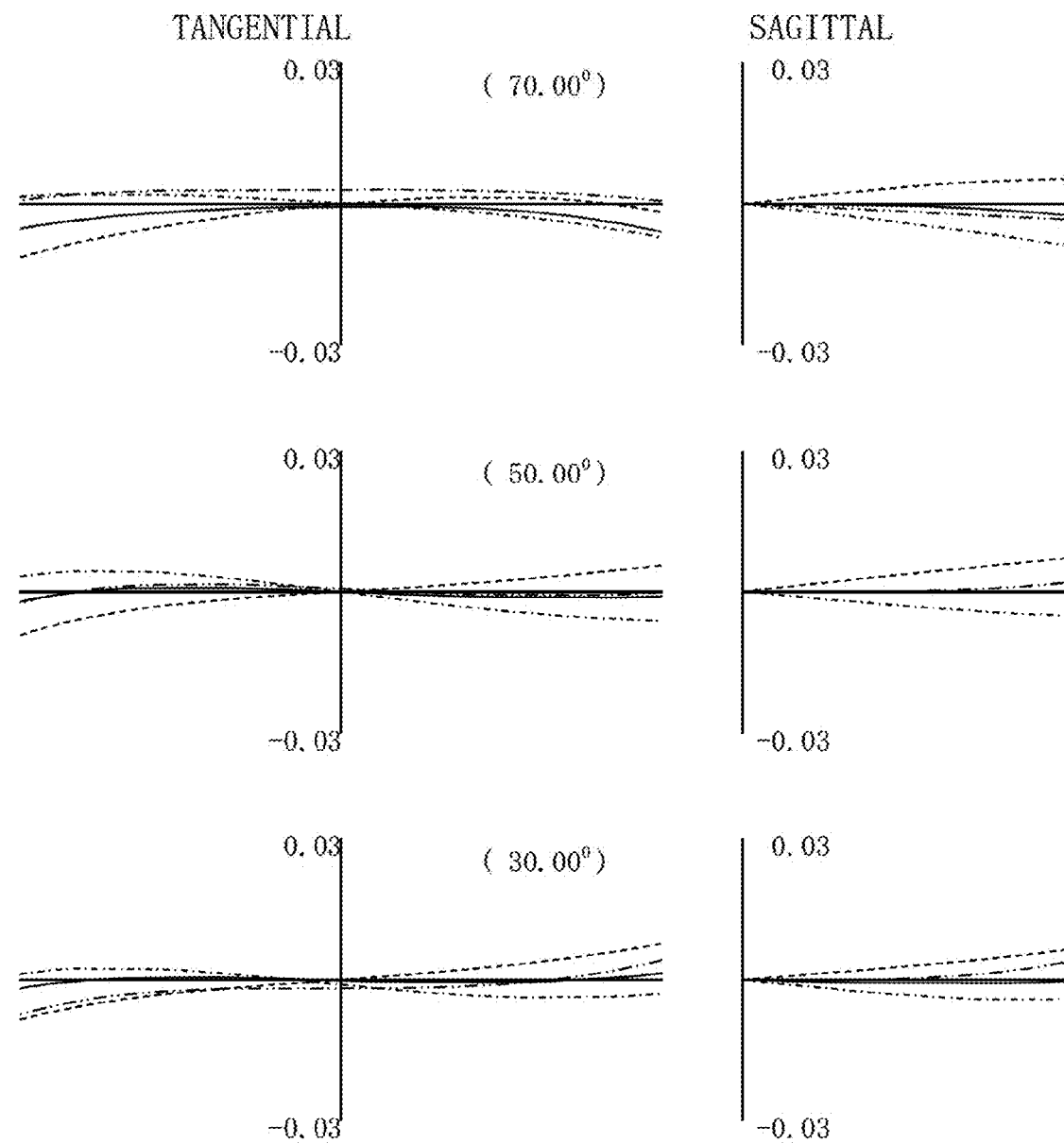
FIG. 8 is a transverse aberration chart for the optical system according to Example 1.

FIG. 8 is a transverse aberration chart for the optical system 28A configured with the various factors of Table 1. This transverse aberration chart is an aberration chart for a fundus image when a no-aberration ideal lens is for convenience introduced at the pupil conjugate Pcj position to evaluate the optical performance of the present Example. Aberration calculation is also performed with the no-aberration ideal lens introduced similarly for each of the subsequent Examples.

In the aberration chart illustrated in FIG. 8, the image height is illustrated on the vertical axis, and the solid line indicates a central wavelength of 587.5618 nm, the dashed line indicates a wavelength of 656.2725 nm, the single-dot broken line indicates a wavelength of 486.1327 nm, and the double-dot broken line indicates a wavelength of 435.8343 nm.

As is clear from the aberration chart illustrated in FIG. 8, the variation in aberration for light in the visible wavelength band is suppressed in the optical system 28A of Example 1, and it is apparent that good correction is achieved. Moreover, it is apparent that the optical system 28A has good correction even in the vicinity of an effective field of view (namely, external illumination angle A) of from 60° to 140° (pupil emission half angle from 30° to 70°). Note that although omitted from illustration, it is confirmed that there is good correction for various aberrations such as spherical aberration, astigmatism, distortion, and the like.

Example 2

Figure 9:
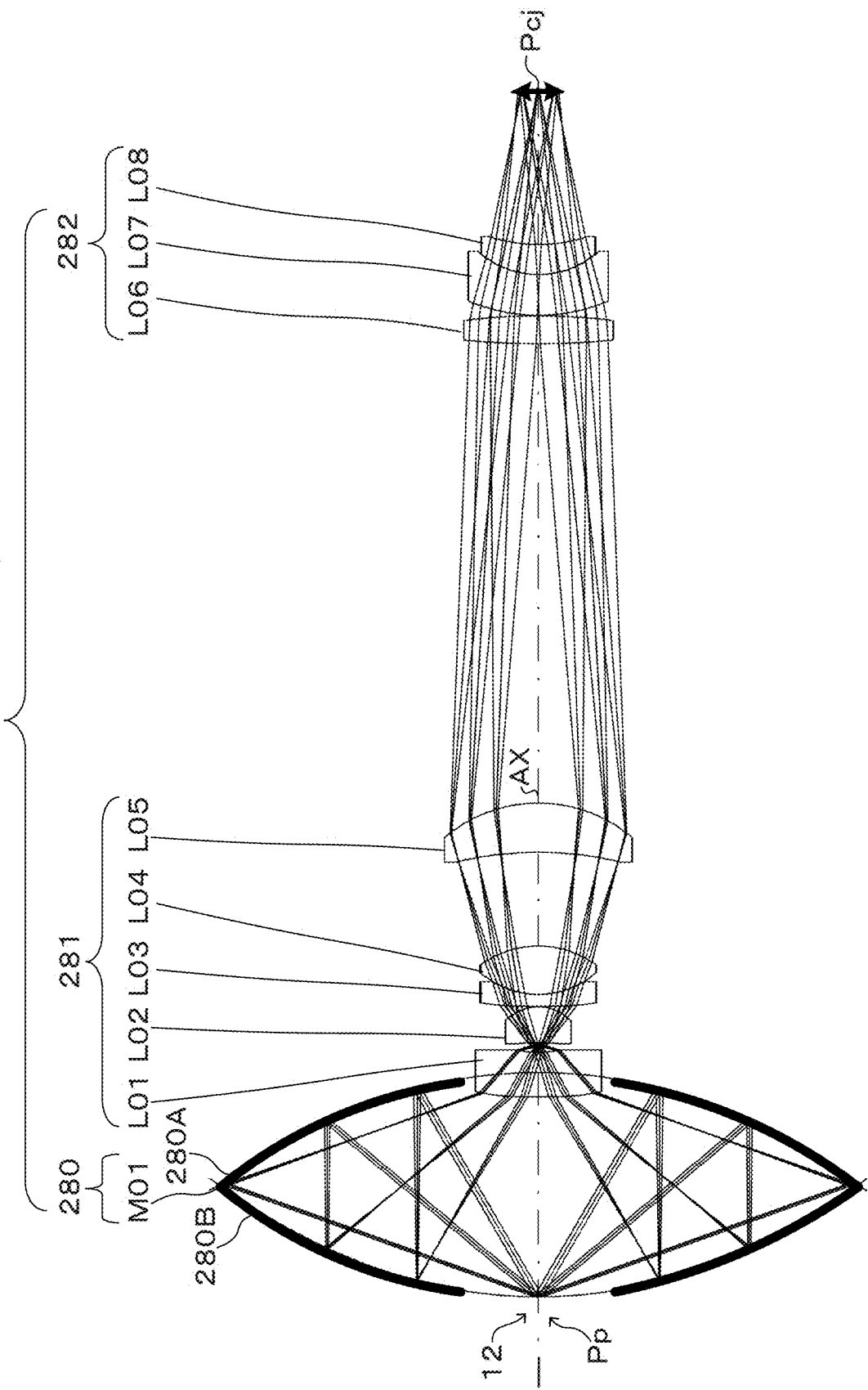
FIG. 9 is a configuration diagram illustrating an example of a configuration of an optical system according to Example 2.

Next, description follows regarding the optical system 28A according to Example 2, with reference to FIG. 9. Example 2 is a modified example of Example 1, the same reference numerals are appended to similar configuration to that of the first exemplary embodiment and Example 1, and detailed explanation thereof will be omitted.

The rays of light illustrated in FIG. 9 illustrate a way in which a pupil conjugate point Pcj is formed by the optical system 28A in space at the opposite side to the examined eye 12 side. The optical system 28A includes, in sequence from the examined eye 12 side, the reflection unit 280, the first lens group 281, and the second lens group 282. The reflection unit 280 includes mirror module M01 in which a second reflection surface 280B and a first reflection surface 280A are arranged in sequence from the pupil Pp side of the examined eye 12. The first lens group 281 includes, in sequence from the pupil Pp side, a negative meniscus lens L01 having a convex surface with an aspherical surface profile facing toward the pupil Pp side, a positive meniscus lens L02 having a concave surface facing toward the pupil Pp side, a negative meniscus lens L03 having a convex surface facing toward the pupil Pp side, a double convex positive lens L04 stuck together with the lens L03, and a positive meniscus lens L05 having a concave surface facing toward the pupil Pp side. A positive lens component is configured by sticking together the negative meniscus lens L03, and the double convex positive lens L04. Moreover, the second lens group 282 includes in sequence from the pupil Pp side, a positive lens L06, a negative meniscus lens L07 having a convex surface facing toward the pupil Pp side, and a positive meniscus lens L08 having a convex surface facing toward the pupil Pp side. A meniscus lens component is formed by sticking the negative meniscus lens L07 and the positive meniscus lens L08 together. All of these optical elements are arranged along a single optical axis AX.

The first lens group 281 according to the present Example includes the negative meniscus lens L01 as the angle conversion lens to catch the wide-angled light beam from the reflection unit 280 and convert the wide-angled light beam into a small-angled light beam. Arranging the convex surface of the negative meniscus lens L01 at the examined eye 12 side of the conjugate position of the pupil Pp enables the lens diameter of the negative meniscus lens L01 to be made smaller. Due to the angles of the wide-angled light beam handled by the reflection unit 280 being converted to smaller angles by the angle conversion lens L01 having a small diameter, the diameters of the subsequent optical elements configuring the first lens group 281 are also smaller. Due to the diameters of the optical elements configuring the first lens group 281 being small, the diameters of the optical elements configuring the second lens group 282 are also small. This means that the common optical system 28 provided with the reflection unit 280 implements a wide-angled optical system with a small number of lenses and compact size. Moreover, due to being able to make the diameter of the angle conversion lens small, wide-angled images of the fundus can be obtained with good aberration performance. Furthermore, such aberration correction is easier than in the optical system 28A according to the Example 1, and as a result this enables wide-angled images of higher precision to be obtained.

Note that, although the negative meniscus lens L01 in this Example serves as the angle conversion lens provided furthest toward the leading end on the examined eye side of the lens unit, this is because the lens surface is positioned further toward the examined eye side than the pupil conjugate position, namely, the center of swing of the parallel light beam being scanned, i.e., the conjugate position of the pupil Pp. Employing a positive lens would be effective in cases in which the angle conversion lens is tangential to the pupil conjugate position or is further to the opposite side from the examined eye than the pupil conjugate position, as in Example 1 illustrated in FIG. 7.

The following Table 2 lists the values of various factors of the optical system 28A in Example 2.

TABLE 2

| Surface No. | Optical Element | Radius of Curvature | Surface Separation | Refractive Index | Divergence |
|---|---|---|---|---|---|
| 1 (pupil plane) | | — | 55 | | |
| 2 (first reflection surface) | M01 | −110 | −55 | | |
| 3 (second reflection surface) | | 110 | 49.0162 | | |
| 4 (aspheric surface) | L01 | 2451.077 | 10.95171 | 1.7552 | 27.57 |
| 5 | | 29.76387 | 2.429038 | | |
| 6 | L02 | −34.3971 | 8.642525 | 1.744 | 44.8 |
| 7 | | −11.1873 | 0.1 | | |
| 8 | L03 | 110.113 | 3 | 1.7552 | 27.57 |
| 9 | L04 | 21.27608 | 11.84793 | 1.62041 | 60.25 |
| 10 | | −23.4687 | 22.98764 | | |
| 11 | L05 | −83.5034 | 12.03545 | 1.7552 | 27.57 |
| 12 | | −34.8994 | 112.718 | | |
| 13 | L06 | 1.98E+02 | 6.742441 | 1.744 | 44.8 |
| 14 | | −139.148 | 0.1 | | |
| 15 | L07 | 42.89894 | 9.984022 | 1.7552 | 27.57 |
| 16 | L08 | 21.72098 | 7.404583 | 1.62041 | 60.25 |
| 17 | | 38.71444 | 38.52239 | | |
| 18 (pupil conjugate plane) | | | | | |

Note that for the mirror M01, the conic constant for the first reflection surface and the second reflection surface of respective surface Nos. 2, 3 is k=−1.

For the surface No. 4 of lens L01 the conic constant is k=0, and the aspheric coefficients are:

A: +0.746884E-04
B: −0.776642E-06
C: +0.648680E-08
D: −0.395590E-10
E: +0.158555E-12
F: −0.394995E-15
G: +0.574153E-18
H: −0.439516E-21
J: +0.135981E-24

Figure 10:
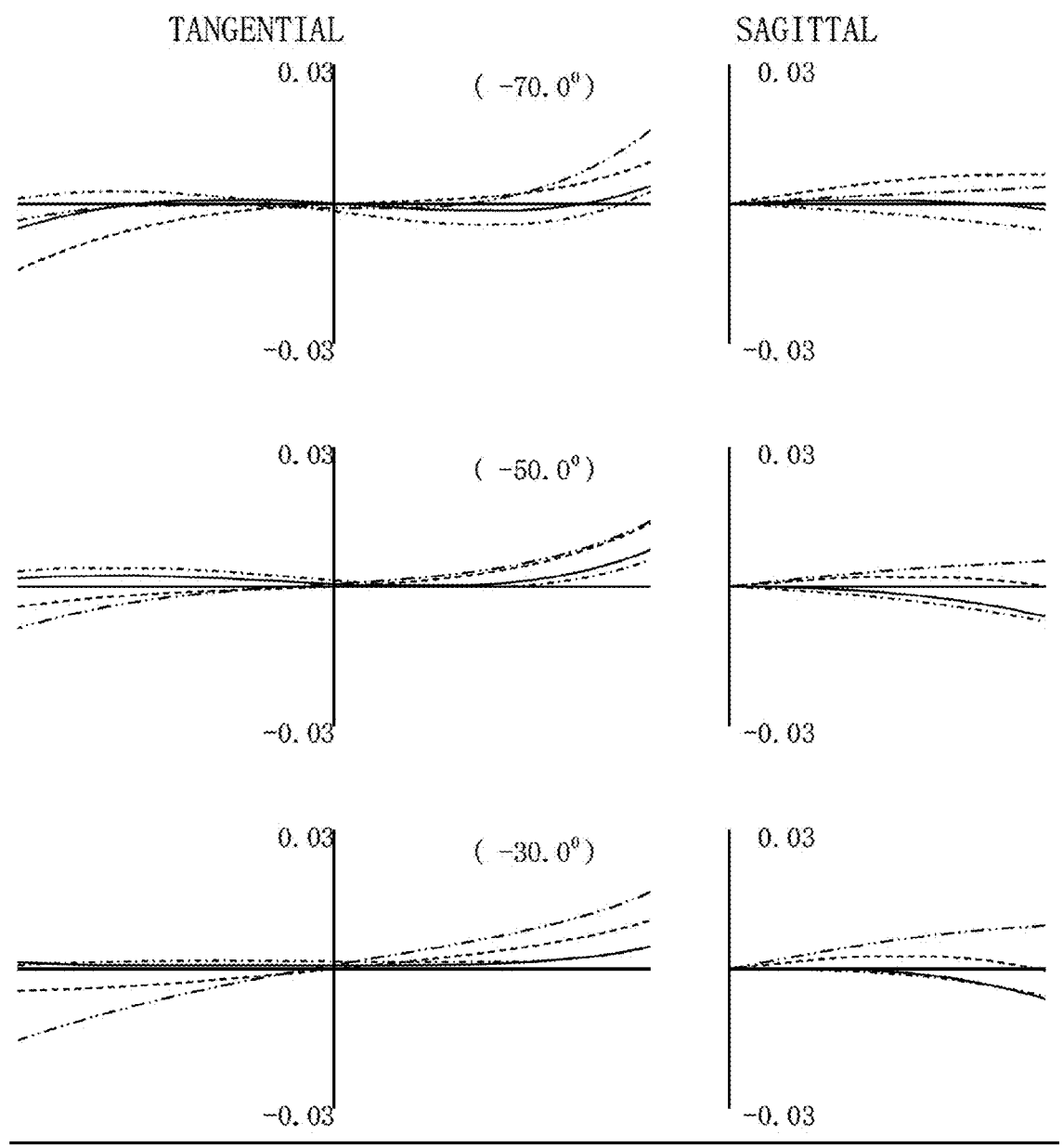
FIG. 10 is a transverse aberration chart for the optical system according to Example 2.

FIG. 10 is a transverse aberration chart for the optical system 28A configured with the various factors of Table 2.

In the aberration chart illustrated in FIG. 10, similarly to in Example 1, the image height is illustrated on the vertical axis, and the solid line indicates a central wavelength of 587.5618 nm, the dashed line indicates a wavelength of 656.2725 nm, the single-dot broken line indicates a wavelength of 486.1327 nm, and the double-dot broken line indicates a wavelength of 435.8343 nm.

As is clear from the aberration chart illustrated in FIG. 10, similarly to in the optical system 28A of Example 1, the variation in aberration for light in the visible wavelength band is suppressed and it is apparent that good correction is achieved.

Second Exemplary Embodiment

Figure 11:
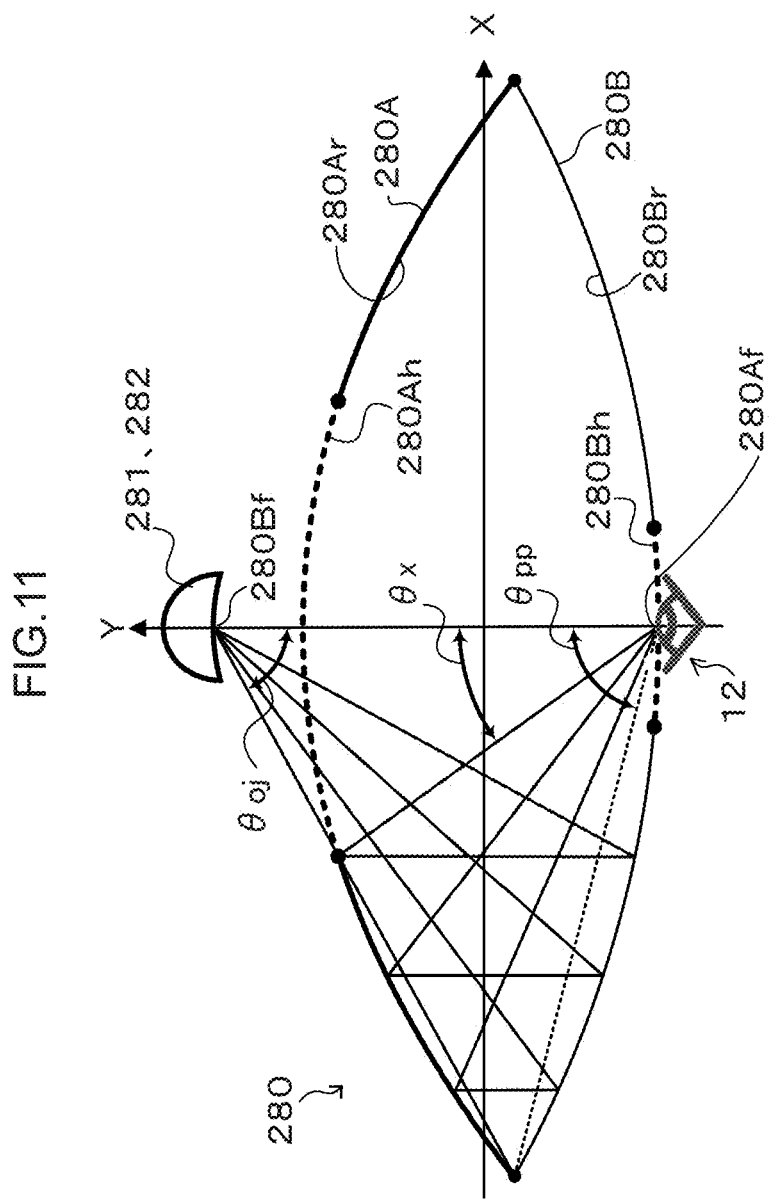
FIG. 11 is a schematic diagram illustrating an example of an reflection mirror unit according to a second exemplary embodiment.
Figure 12:
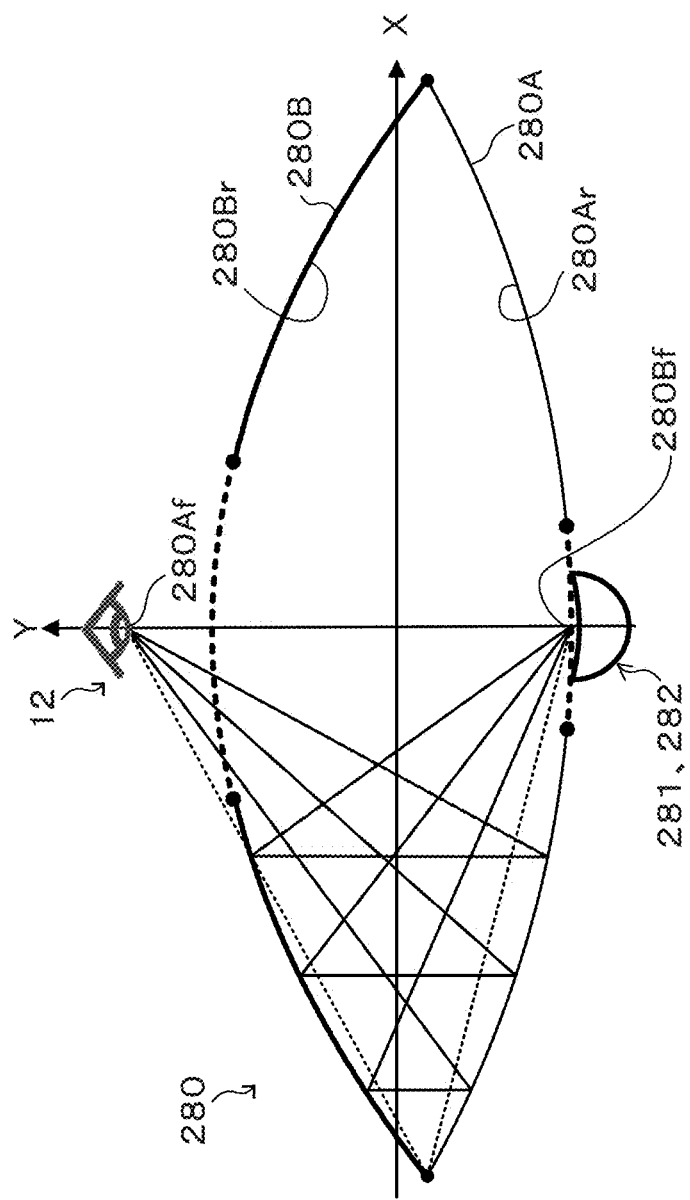
FIG. 12 is a schematic diagram illustrating another example of an reflection mirror unit according to the second exemplary embodiment.

Explanation follows regarding a second exemplary embodiment, with reference to FIG. 11 and FIG. 12. The second exemplary embodiment has a configuration similar to that of the first exemplary embodiment, except in the configuration of a reflection unit 280. The same reference numerals are appended to similar configuration to in the first exemplary embodiment, and detailed explanation thereof will be omitted.

The reflection unit 280 according to the first exemplary embodiment is equipped with the first reflection surface 280A and the second reflection surface 280B that are parabolic surfaces having the same focal length f, and is configured such that the focal point of one is superimposed on the apex of the other, with the focal points having a same-size conjugate relationship to each other without aberration. In the reflection unit 280 according to the second exemplary embodiment however, the focal length of the first concave mirror 280A and the focal length of the second reflection surface 280B are different to each other.

As described above, the effective diameter of the aperture provided in the reflection unit 280 is preferably as small as possible, and the position of the pupil of the examined eye 12, and the position of the pupil for the first lens group 281 and the second lens group 282 are preferably matched as closely as possible to the focal point positions of the reflection surfaces of the reflection unit 280. However, there is a loss in degrees of freedom in relation to setting the position of the pupil of the examined eye 12, and the position of the pupil by the first lens group 281 and the second lens group 282. Moreover, in relation to aberration correction in the first lens group 281 and the second lens group 282, there is a limitation to the angles of light beams from the reflection unit 280 (radiating angles). To address this, the present exemplary embodiment provides an optical system 28A with easy handling while maintaining the fundamental conjugate relationship of the reflection unit 280 that is the opposing arrangement in which at least one out of a focal point of a first concave mirror or a focal point of a second concave mirror configuring the reflection unit 280 is positioned at the aperture of the other concave mirror.

FIG. 11 illustrates an example of a reflection unit 280 according to the present exemplary embodiment. A focal length fa of the first reflection surface 280Ar is shorter than a focal length fb of the second reflection surface 280Br (fa<fb). A focal point 280Af of a first reflection surface 280Ar is aligned with an apex of a second reflection surface 280Br (for example, the center of the second reflection surface 280Br). However, a focal point 280Bf or the second reflection surface 280Br is separated away from the apex of the first reflection surface 280Ar (for example, the center of the first reflection surface 280Ar) and is positioned at a first lens group 281 side. The focal point 280Af and the focal point 280Bf are positioned on the same optical axis, and the conjugate relationships therebetween is maintained.

Moreover, as illustrated in FIG. 11, by placing the examined eye 12 on the second reflection surface 280Br side and placing an observation optical system (the first lens group 281 and a second lens group 282) on the first reflection surface 280Ar side, the effective field of view (external illumination angle A from the pupil) at the examined eye 12 side is larger than 141°. In this example a half angle of the external illumination angle A is indicated by pupil emission half angle θpp, and the pupil emission half angle θpp is larger than 70.5°. However, an angle θoj corresponding to the pupil emission half angle θpp but on the observation optical system side is smaller than 70.5°. This means that aberration correction in the observation optical system is easier than would be the case in a reflection unit 280 having an opposing arrangement of concave mirrors with the same focal length f.

Moreover, the space (center shielding) through which to pass light beams toward the observation optical system is larger than would be the case in a reflection unit 280 having an opposing arrangement of concave mirrors with the same focal length f. In the example in FIG. 11, an angle from the examined eye 12 side to obtain the space (center shielding) through which to pass the light beam toward the observation optical system, namely to obtain the aperture 280Ah, is indicated by angle θx.

In this case, the pupil emission half angle θpp is expressed by the following Equation (4) and the angle θx is expressed by the following Equation (5), wherein the x axis is a straight line passing through a position bisecting the focal length fa of the first reflection surface 280A, and the y axis is a straight line passing through the apex (for example, the center) of the second reflection surface 280Br.

$$\theta pp = \tan^{-1}((A/C)^{1/2}/(A/4-C)) \quad \text{Equation (4)}$$

$$\theta x = \tan^{-1}((B(A/C)^{1/2}/(A/4-B^2/C)) \quad \text{Equation (5)}$$

wherein $A=4fa$, $B=fb-fa$, $C=(fa \cdot fb)/(fa+fb)$.

Thus the relationships of Equation (4) and Equation (5) may be employed to find the most appropriate value for the size of the aperture 280Ah to make aberration correction in the observation optical system easy.

With respect to an angle θx for looking into the aperture 280Ah of the first reflection mirror 280A from the examined eye, in practice preferably the reflection surface on the lens unit side are formed so that the aperture satisfies the conditions of the equation expressed by $$\theta x \leq 22.5°.$$

This angle corresponds to the radius of the center shielding of a ring shaped image of the fundus of the examined eye 12 obtained, and so the smaller the better. However, satisfying the conditions given above is advantageous in cases in which, as illustrated in the example of FIG. 6, a combination is performed with a central portion image from a conventional device capable of obtaining an image at the optical axis center.

As described above, setting the focal point 280Bf of the second reflection surface 280Br away from the first reflection surface 280Ar enables the reflection unit and the subsequent lens unit, and in particular the angle conversion lens at the leading end thereof, to be provided separated from each other. This facilitates a removal operation to remove contamination if contamination such as a foreign body has ingressed into the reflection unit, and is also advantageous not only from a manufacturing perspective, but also when performing maintenance or the like.

Modified Example

FIG. 12 illustrates a modified example of a reflection unit 280 according to the present exemplary embodiment. In this example, a focal length fa of a first reflection surface 280Ar on the side positioned away from the examined eye 12 is longer than a focal length fb of a second reflection surface 280Br (fa>fb). Due to adopting such a configuration, the examined eye 12 is set at a position away from the second reflection surface 280Br, as a result this enables a space to be formed between the examined eye 12 and the reflection unit 280. A distance can accordingly be secured between the examined eye and the back face (convex surface) of a second parabolic surface mirror 280B, improving usability.

As the second exemplary embodiment described above, a configuration illustrated in FIG. 11 and FIG. 12 that satisfies the condition $$0 \leq |fa-fb| \leq 0.1(fa+fb),$$

is advantageous from the perspectives of limiting the size of the central aperture and aberration correction, wherein fa is a focal length of a first reflection mirror of the reflection unit, namely of a concave mirror away from the examined eye, and fb is a focal length of a second reflection mirror, namely a concave mirror near to the examined eye, and both are positive focal lengths.

Note that in the configuration described above, making the position of central apertures of respective reflection mirrors the position of the focal points of each other is a basic configuration, but for different focal lengths, as described above, there is a tendency for the size of the center shielding to become larger the greater the difference. However, in order to make the device smaller, and to include a separation between the examined eye and the device, in practice an optimal balance needs to be made for the device overall in the ranges described above. Also in case in which the focal point of one reflection surface is positioned at the central aperture of the other reflection surface, obviously slight modifications are permitted to optimize the device overall including aberration balance while assuming this fundamental configuration.

Explanation has been given in the first exemplary embodiment and the second exemplary embodiment of an optical system 28A including a single reflection unit 280, however there is no limitation thereto. Plural, i.e. two or more, of the reflection mirror units may be coupled and combined together such that there is pupil-to-pupil alignment of the respective reflection units with each other. Moreover, as explained with reference to the second exemplary embodiment, the focal lengths of the first reflection surface 280A and the second reflection surface 280B may differ from each other.

Employing plural reflection mirror units 280 enables treatment to be performed to the relayed pupil of the examined eye 12.

Figure 13:
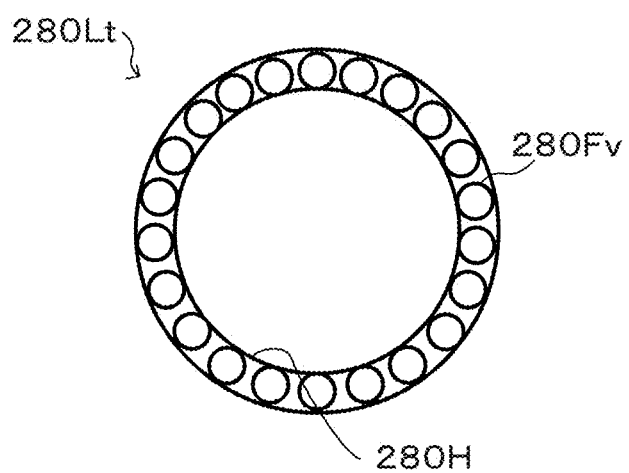
FIG. 13 is a diagram illustrating an example of an illumination adapter.

For example, illumination into the fundus of the examined eye 12 is enabled by direct illumination using an light source at a periphery of a relayed image of the pupil P. The periphery of the relayed image of the pupil P is illuminated by providing an illumination adapter 280Lt as illustrated in the example of FIG. 13 at the periphery of the relayed image of the pupil P. The illumination adapter 280Lt includes the illumination light sources 280Fv arranged so as to surround the relayed pupil image Pp'. In FIG. 13 there are plural light sources 280Fv provided arrayed in a ring shape so as to surround a circular shaped space having a diameter equivalent to the aperture diameter of the apertures provided in the reflection surfaces 280. This ring shaped illumination light source is re-formed as an image at the periphery of the pupil of the examined eye, and illuminates the inside of the examined eye. An imaging light beam on the cornea passes through a central portion including the optical axis, and results in a ring shaped illumination light. This enables the imaging optical path and the illumination optical path to the fundus to be separated from each other, enabling light reflected by the cornea to be prevented from mixing with the imaging light.

Moreover, the reflection unit 280 includes the apertures 280Ah, 280Bh at central portions of the optical axis thereof. The light passing through the apertures 280Ah, 280Bh travels on unaffected toward the first lens group 281 and the second lens group 282. An improvement in image precision in the vicinity of the optical axis center is achieved by adding a lens arranged on the optical axis to at least one lens group from out of the first lens group 281 or the second lens group 282, or by changing an inter-lens separation.

Third Exemplary Embodiment

Figure 14:
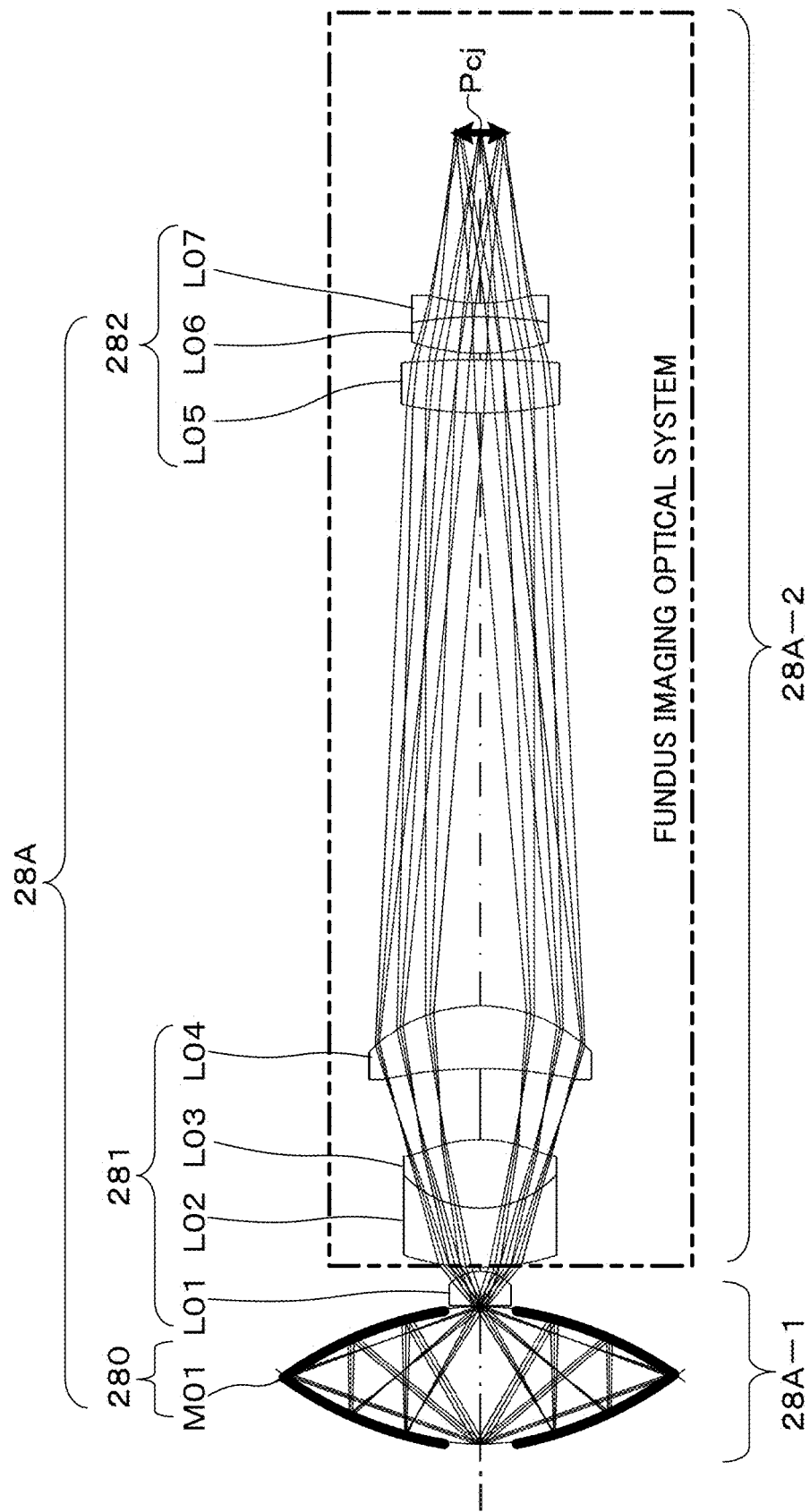
FIG. 14 is a schematic diagram illustrating an example of an optical system according to a third exemplary embodiment.

Next, description follows regarding a third exemplary embodiment, with reference to FIG. 14. The third exemplary embodiment has a similar optical configuration to that of the first exemplary embodiment and the second exemplary embodiment, and the same reference numerals are appended to configuration similar to that of the first exemplary embodiment, and detailed explanation thereof will be omitted.

In the first exemplary embodiment and the second exemplary embodiment, the optical system 28A is configured including a reflection unit 280, a first lens group 281, and a second lens group 282 (see FIG. 7). The third exemplary embodiment has a configuration in which optical elements of the optical system 28A are classified by function.

As illustrated in FIG. 14, the optical system 28A has a configuration classified into a first optical system 28A-1 and a second optical system 28A-2.

The second optical system 28A-2 includes lenses L02 to L07, and is configured so as to function as a fundus imaging optical system for a normal angle of view capable of observing the fundus with rays of light near to the optical axis (namely, capable of narrow field of view observation).

However, the first optical system 28A-1 is configured including a reflection unit 280, and the lens L01. The lens L01 is formed so as to function as an angle conversion lens. Namely, the lens L01 converts the angles of the ultrawide-angled light rays from the examined eye 12 through the reflection unit 280 into a smaller angle than the angle of the optical light rays. Thus by inserting the first optical system 28A-1 between the examined eye and the second optical system 28A-2 provides part of a configuration of an optical system to implement wide field of view observations, and arranging the first optical system 28A-1 and the second optical system 28A-2 on the same optical axis results in the functions of an optical system to implement wide field of view observations.

Thus by adopting a configuration for the optical system 28A in which the first optical system 28A-1 and the second optical system 28A-2 are separated, and by mounting or demounting the first optical system 28A-1, a device for use in ultrawide-angled field of view observations can be provided, and a device for use in both observations including narrow field of view observations can be provided. In cases in which the second optical system 28A-2 is formed so as to function as an optical system capable of fundus observations using near axis rays of light, by adopting a configuration in which the second optical system 28A-2 is movable along the optical axis direction toward the examined eye 12, a simple switch from wide field of view observations to narrow field of view observations is possible by removing the first optical system 28A-1. Such a configuration enables the same optical system (the second optical system 28A-2) to be utilized for both wide field of view and narrow field of view observations.

Note that in cases in which the optical module 28A-1 is provided, preferably a configuration is adopted in which the lens L01 for use in angle conversion is attached as an integrated structure to the reflection unit 280. Moreover, the lens L01 may also be attached to the reflection mirror units 280 using an attachment.

Note that as described above, an optical unit 28A combining the reflection unit 280 and a lens unit is not able to obtain information about a fundus region at the center of the optical axis. However, by performing imaging plural times while shifting the position of the examined eye 12 with respect to the optical axis, information about the central portion can be supplemented from the plural images obtained thereby, enabling information about a wide region of the fundus to be obtained. Namely, by imaging while moving the positions of the visual axis and the optical axis to plural different positions, an image of a region can be acquired that would be difficult to acquire by imaging with the visual axis and the optical axis aligned. This enables a single wide image to be formed by combining the plural images acquired. In such cases the visual axis of the examined eye may be appropriately set by presenting a non-illustrated fixation target to the examined eye, and getting the examined eye to look at the presented fixation target.

Fourth Exemplary Embodiment

Next, description follows regarding a fourth exemplary embodiment according to technology disclosed herein. The fourth exemplary embodiment is configured similarly to the first exemplary embodiment to the third exemplary embodiment, the same reference numerals are appended to similar configuration to that of the first exemplary embodiment to the third exemplary embodiment, and detailed explanation thereof will be omitted.

Figure 15:
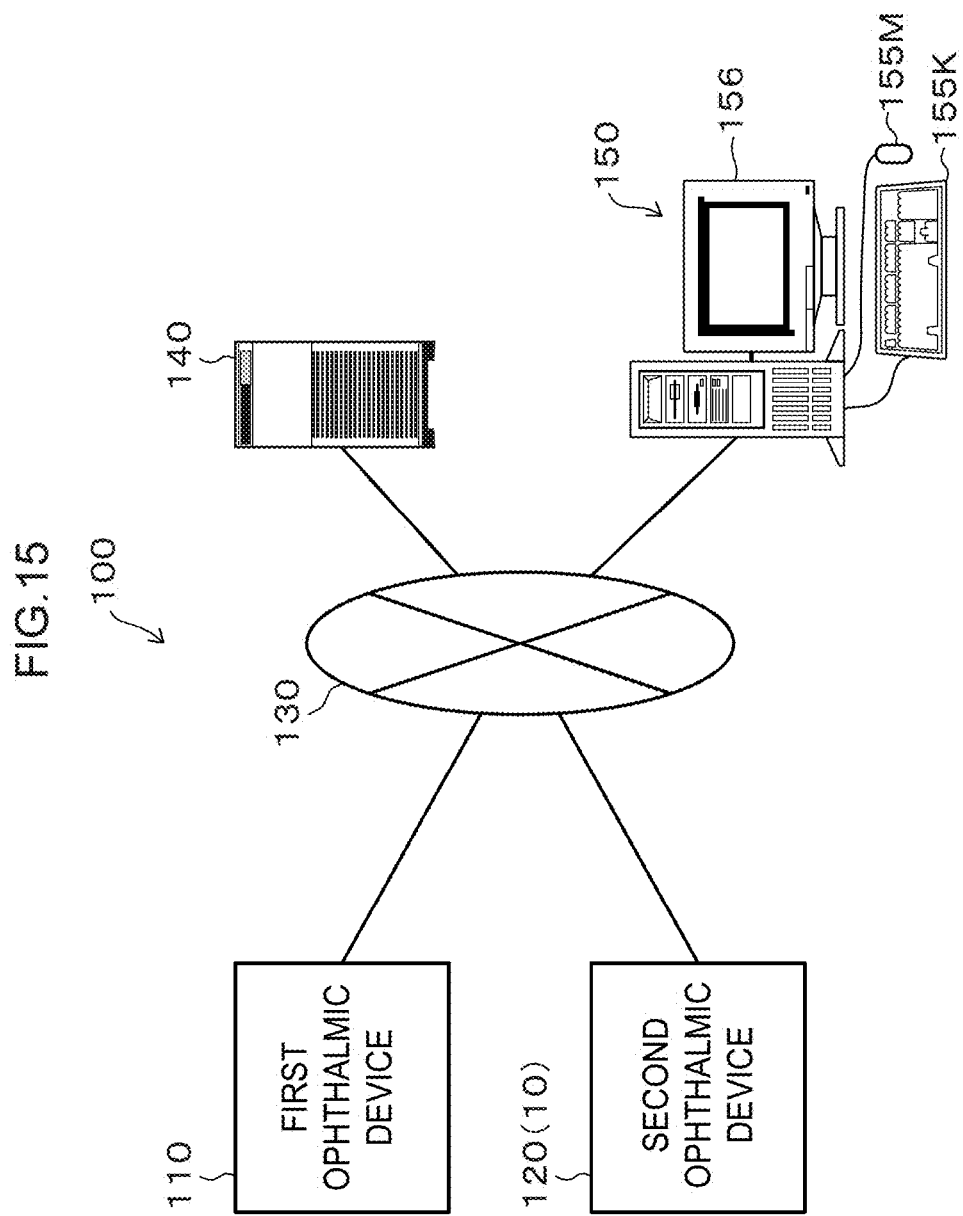
FIG. 15 is a block diagram illustrating an example of an overall configuration of an image system according to a fourth exemplary embodiment.

FIG. 15 illustrates an image system 100 as an example of an ophthalmic system capable of presenting an entire image of an imaging range 12A according to the fourth exemplary embodiment. The image system 100 includes a first ophthalmic device 110, a second ophthalmic device 120, a network 130 such as the Internet or a local area network, an image server 140, and an image display terminal 150.

As illustrated in FIG. 15, the image system 100 includes the first ophthalmic device 110, the second ophthalmic device 120, the image server 140, the image display terminal 150 (for example, a computer 150, hereafter also referred to as a PC 150), and the network 130, such as the Internet or a local area network, serving as a network to connect these devices together. The first ophthalmic device 110 is an ordinary ophthalmic device to present an imaging range of, for example, an external scanning angle A of about 45° (hereafter also referred to as a narrow-angle ophthalmic device 110). The first ophthalmic device 110 is employed to acquire narrow-angled fundus images depicting a fundus region in the vicinity of the optical axis AX (near-axis region). The second ophthalmic device 120 is the ophthalmic device 10 according to any one of the above exemplary embodiments, and is a wide-angled ophthalmic device to present an imaging range of, for example, an external scanning angle A of about 130° (hereafter also referred to as a wide-angle ophthalmic device 120). Wide-angled fundus images are acquired using the second ophthalmic device 120. An example now follows regarding an SLO image of a fundus F, however there is no limitation thereto. An ophthalmic image handled by the image system 100 may, as described above, be an OCT image of the fundus F, or may be an image of the anterior eye segment.

The wide-angled fundus images acquired with the second ophthalmic device 120 have, as described with reference to FIG. 6, a central portion, namely, the vicinity of the optical axis AX, of an image where a fundus image is not depicted. In the present exemplary embodiment, the narrow-angled fundus image acquired with the first ophthalmic device 110 and the wide-angled fundus image acquired with the second ophthalmic device 120 are employed to generate a wide-angled fundus image depicting the entire fundus image.

The first ophthalmic device 110 transmits narrow-angled fundus image data associated with a patient ID to the image server 140 over the network 130. The second ophthalmic device 120 also transmits wide-angled fundus image data associated with the patient ID to the image server 140 over the network 130. The image server 140 manages this image data. The image server 140 exchanges various information with the PC 150 over the network 130. The image server 140 transmits fundus image data to the PC 150 in response to instructions from the PC 150. The PC 150 is stored with an image processing program to combine the narrow-angled fundus image acquired by the first ophthalmic device 110 with the wide-angled fundus image acquired by the second ophthalmic device 120, and to generate a wide-angled fundus image depicting the entire fundus image.

Note that although in the present exemplary embodiment an example will be described of the image system 100 in which the PC 150 is independent of the first ophthalmic device 110 and the second ophthalmic device 120, the first ophthalmic device 110 and the second ophthalmic device 120 may also include functionality of the PC 150.

Figure 17:
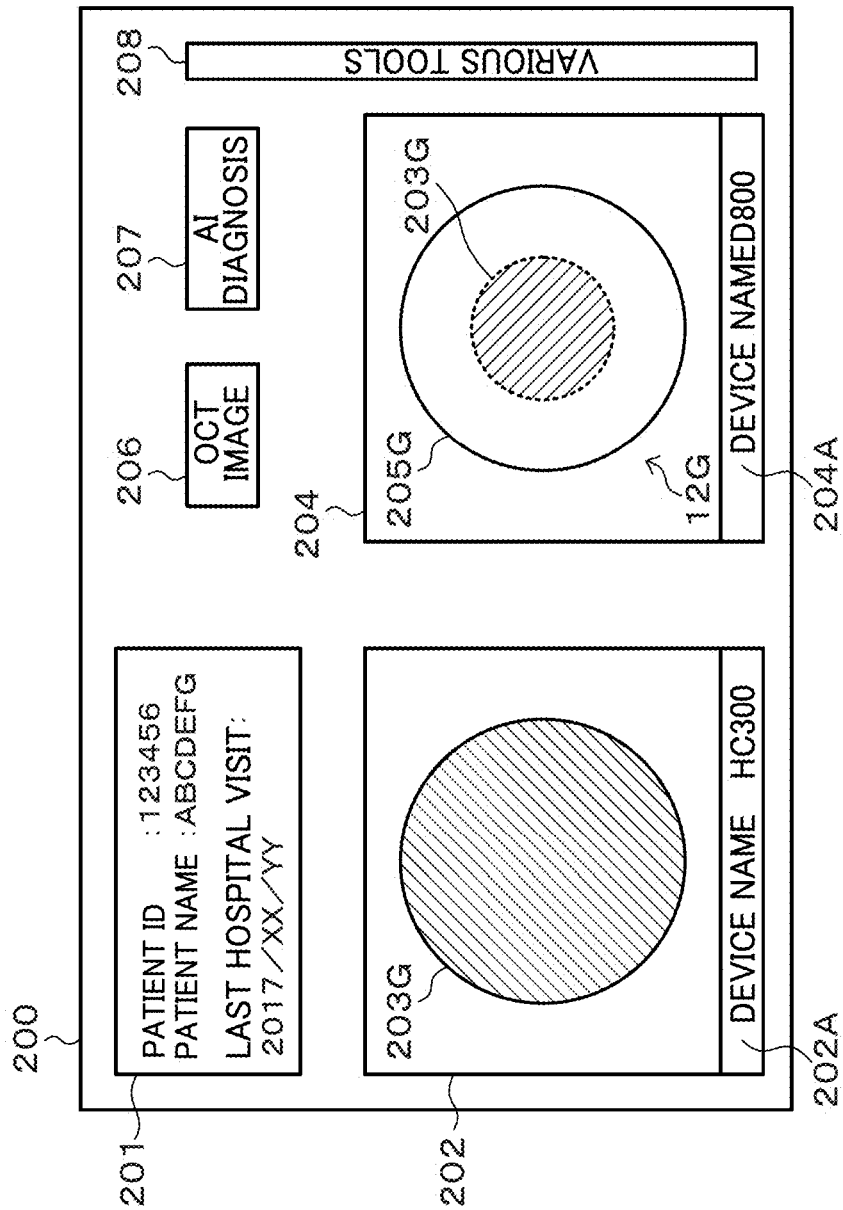
FIG. 17 is a diagram illustrating an example of a display screen of a display according to the fourth exemplary embodiment.

Next, description follows regarding the image processing program. A user uses an electronic medical record screen displayed on a display of the PC 150 to instruct execution of the image processing program in the PC 150. FIG. 17 illustrates an electronic medical record screen 200 displayed on the display of the PC 150. The screen 200 includes a display region 201 to display patient information, a display region 202 to display a narrow-angled fundus image 203G acquired by the first ophthalmic device 110, and a display region 204 to display a wide-angled fundus image 205G acquired by the second ophthalmic device 120. A display region 202A is provided in the display region 202 to display a model name of the first ophthalmic device 110. Moreover, a display region 204A is also provided in the display region 204 to display a model name of the second ophthalmic device 120. Note that the screen 200 also includes instruction buttons such as an instruction button 206 to instruction reading in an OCT image, an instruction button 207 to instruct execution of artificial intelligence diagnosis on an ophthalmic image, and an instruction button 208 to instruct various settings.

Figure 16:
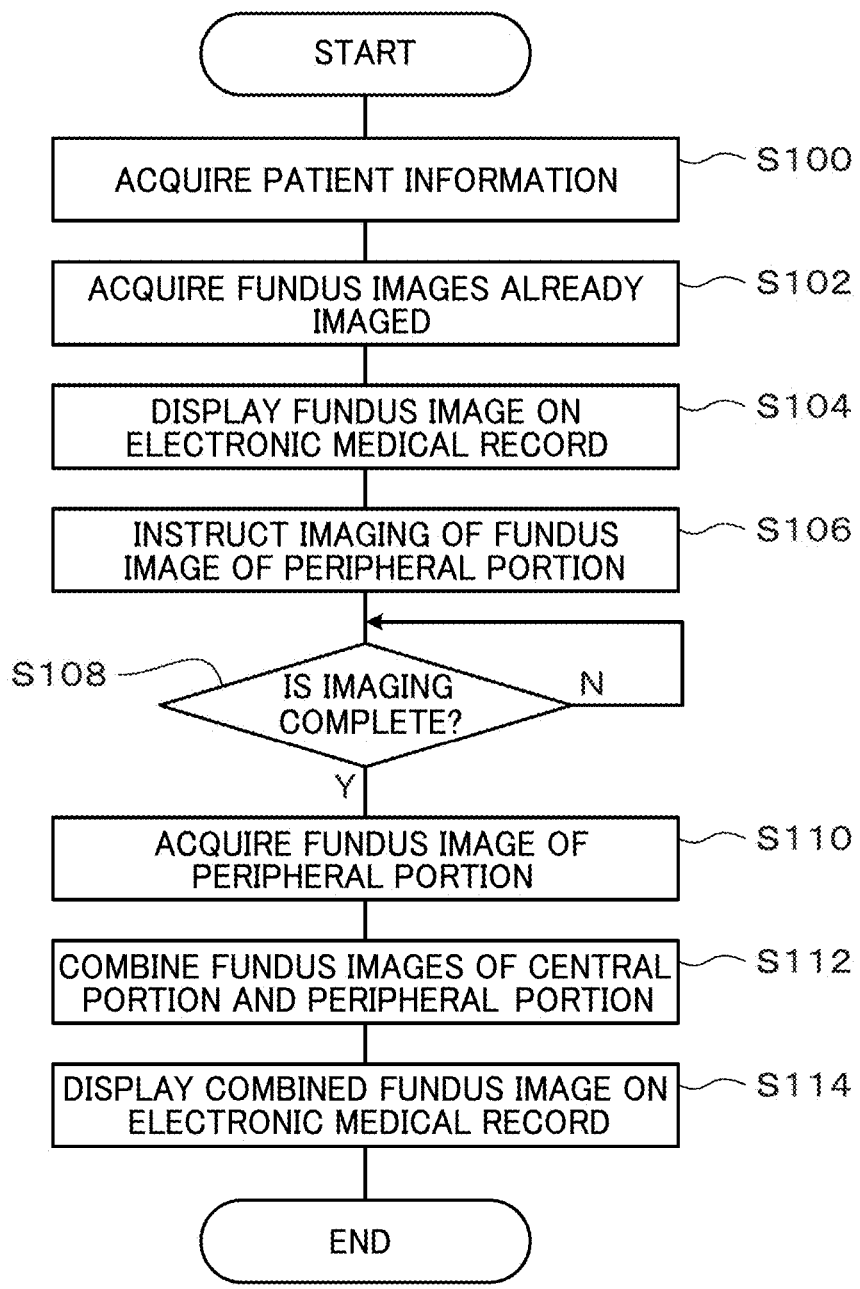
FIG. 16 is a flowchart illustrating an example of flow of processing executed by an image display terminal according to the fourth exemplary embodiment.

FIG. 16 illustrates a flow of processing of the image processing program executed by the PC 150.

First, at step S100 in FIG. 16, patient information acquisition processing is executed, and the acquired patient information is displayed on a display 156.

Then at step S102, fundus images of the patient that have already been imaged are acquired, and are displayed on the electronic medical record in the next step S104.

Next, at step S106 illustrated in FIG. 16, imaging instruction processing is executed for imaging an image of a second fundus image region 12G2 at the periphery of a fundus central site, and negative determination is made at step S108 until imaging had been completed. When affirmative determination is made at step S108, at step S110 an imaged image is acquired imaging the fundus at the periphery of the central site of the examined eye 12 of the patient ID. On receipt of the instruction from the image display terminal 150, the second ophthalmic device 120 images the fundus at the periphery of the central site of the examined eye 12 of the patient ID, and outputs the imaged image to the image display terminal 150. Note that imaging the fundus at the periphery of the central site of the examined eye 12 and outputting the imaged image may be processing performed through the image server 140.

At the next step S112, image processing is executed to combine the image imaged by the first ophthalmic device 110 acquired at step S102 with the image imaged by the second ophthalmic device 120 acquired at step S110. At the next step S114, the combined image resulting from the image processing is displayed in the display region 204 as a two-dimensional image 12G for the entire imaging range 12A.

The processing to combine the image 203G imaged by the first ophthalmic device 110 with the image 205G imaged by the second ophthalmic device 120 may, for example, be processing executed to generate a three-dimensional image, sectional image, or surface image of the retina using 3D data or scan data, together with execution of segmentation processing. Moreover, a fundus image may be generated using various data obtained from the SLO unit 18.

For example, in cases in which such images are combined, image processing may be executed to rotate or enlarged or contract images so as to overlap blood vessel patterns in each of the images. The combined image enables a wide-angled image to be obtained that appears as if it had been imaged by an ophthalmic instrument using wide-angled image imaging with an imaging angle of view of 100° or greater. The image processing to combine images is not limited to the methods described above, and obviously any known method may be employed therefor. The combine image is stored and retained in the image server 140.

FIG. 17 illustrates an example of the electronic medical record screen 200 in which the image 203G imaged by the first ophthalmic device 110 and the image 205G imaged by the second ophthalmic device 120 have been combined to give the two-dimensional image 12G displayed in the display region 204.

As described above, in the fourth exemplary embodiment, an image of the fundus center and an image of the periphery to a fundus central site are combined so as to obtain the two-dimensional image 12G of the entire imaging range 12A. This enables a wide-angled image to be obtained as if imaged by an ophthalmic instrument using wide-angled image imaging with an imaging angle of view of, for example, 100°.

A preferable function for the image system 100 according to the fourth exemplary embodiment is case in which diagnosis is performed by an ophthalmologist is observing the fundus image 12G of the examined eye 12. Namely, diagnosis is performed based on the fundus image combined in the image system 100, and an electronic medical record function of an image viewer is employed to input the diagnosis result. Moreover, in cases in which AI diagnosis is to be performed of a fundus image 12G, the button 207 is pressed or clicked on a non-illustrated interface to transition to an AI diagnosis mode. Moreover, in cases in which an OCT image is needed for diagnosis then the button 206 is pressed or clicked and transition is made to an OCT mode.

An ophthalmologist is able to perform an accurate diagnosis of a fundus central portion such as an optic nerve head or macular using a fundus image of the central portion of a high resolution image with an imaging angle of view of 30°, and is also able to perform accurate determination as to whether or not there is a pathological lesion at the retina periphery portion using the combined fundus image 12G with an imaging angle of view equivalent to 100° or greater.

However, often an ophthalmologist has an ophthalmic instrument for performing diagnosis using high resolution images of the fundus and the retina. The imaging angle of view of such high resolution ophthalmic instruments is in a range of from 10° to 30°, and it is difficult to image peripheral portions of the fundus or retina exceeding such a range. An ophthalmologist accordingly needs to buy a separate fundus instrument for wide-angles and ultrawide-angles for use with fundus and retina peripheral portions. In contrast thereto, by employing the image system 100 according to the fourth exemplary embodiment, an already owned high resolution ophthalmic instrument can be effectively utilized for diagnosis using high resolution images of a central portion of the fundus and retina without buying a new wide-angled or ultrawide-angled fundus instrument. Moreover, peripheral portions of the fundus and retina can be diagnosed using the combined fundus image with a wide angle of view exceeding 100°.

Fifth Exemplary Embodiment

Next, description follows regarding a fifth exemplary embodiment. The fifth exemplary embodiment is related to an ophthalmic device equipped with plural optical systems. The same reference numerals are appended to similar configuration to the above exemplary embodiments, and detailed explanation thereof will be omitted.

An optical system 28A according to the present exemplary embodiment includes, as illustrated in FIG. 18, a first optical system 28A1 and a second optical system 28A2. The optical system 28A also further includes a switching mechanism 28B to switch the optical system used for imaging between the first optical system 28A1 and the second optical system 28A2 according to instructions from a control device 16. A moving device such as a rotating stage or a single axis stage may, for example, be employed as the switching mechanism 28B. Although an example will be given regarding an SLO image of a fundus F, there is no limitation thereto. The ophthalmic image handled by the ophthalmic device 10 may, as described above, be an OCT image of the fundus F, or may be an image of the anterior eye segment.

The optical system 28A1 is, for example, a narrow-angled optical system that presents an imaging range of approximately 45° for an external illumination angle A. A narrow-angled fundus image depicting a fundus region in the vicinity of the optical axis AX is acquired using the optical system 28A1. The optical system 28A2 includes a reflection unit 280 and is, as described with reference to the above exemplary embodiments, a wide-angled optical system for presenting an imaging range of approximately 130° as an external illumination angle A. A wide-angled fundus image is acquired using the optical system 28A2. As described with reference to FIG. 6, a central portion of the wide-angled fundus image, namely in the vicinity of the optical axis AX, is not depicted in the fundus image. Thus in the present exemplary embodiment, a narrow-angled fundus image acquired using the optical system 28A1 and a wide-angled fundus image acquired using the optical system 28A2 are employed to generate a wide-angled fundus image in which the entire fundus image is depicted. Note that image combination of the narrow-angled fundus image and the wide-angled fundus image is performed as described above, and so detailed explanation thereof will be omitted.

The present exemplary embodiment enables a narrow-angled fundus image and a wide-angled fundus image to be acquired by using the narrow-angled optical system 28A1 and the wide-angled optical system 28A2. This enables an ophthalmologist to perform accurate diagnosis of a fundus central portion such as an optic nerve head or macular using a narrow-angled fundus image, and, as required, also perform diagnosis of a retina periphery portion using the combined wide-angled fundus image.

FIG. 19 illustrates an example of a system in which a mountable/demountable optical module 28A-1 is employed. The optical module 28A-1 corresponds to the reflection unit 280 and specifically, may be effectively configured by removing the lens L01 employed for angle conversion at the leading end portion in the first lens group 281 illustrated in FIG. 7 and in FIG. 9.

As illustrated in FIG. 19, a mechanism to mount/demount the optical module 28A-1 is performed by a switching mechanism 28B. In such cases, the switching mechanism 28B may be configured to move an optical module 28A-2 along the optical axis direction to fill a space between the examined eye 12 and the optical module 28A-2 arising when the optical module 28A-1 is removed. Moreover, functional improvement may be made to an image on the axis by a configuration in which a separate lens is added to the leading end of the optical module 28A-2 corresponding to a lens unit for a unit in which the optical module 28A-1 is replaceable. Adopting such an approach enables a fundus imaging device to be provided that also realizes field of view observations for both wide field of view observations and narrow field of view observations with the mechanism to mount/demount the optical module 28A-1.

Furthermore, in an optical system capable of imaging an ultrawide-angle peripheral region, extraneous light can be prevented by providing a shielding plate at a central region including the optical axis. Limiting the illumination region of scanning light by the SLO unit 18 and the OCT unit 20 to a ring-shaped region of the imaging field of view enables extraneous light to be reduced.

Although examples have been give above of exemplary embodiments of the technology disclosed herein, the technological scope of the technology disclosed herein is not limited by these exemplary embodiments. Various modifications and improvements may be made to the above exemplary embodiments within a scope not departing from the spirit of the technology disclosed herein. The technological scope of the technology disclosed herein also includes such modifications and improvements. All publications, patent applications and technical standards referenced in the present specification are incorporated by reference in the present specification to the same extent as if each individual publication, patent application, or technical standard was specifically and individually indicated to be incorporated by reference.

REFERENCE NUMERALS

10 ophthalmic device
12 examined eye
12A imaging range
16 control device
19 scanning device
28 common optical system
28A optical system
100 image system
110 first ophthalmic device
120 second ophthalmic device
130 network
140 image server
150 computer
A external illumination angle

The invention claimed is:

1. An ophthalmic device comprising:
 a light source;
 a scanning unit that scans light from the light source;
 a reflection unit including a first concave mirror and a second concave mirror; and
 a lens unit configured to guide the light from the scanning unit to the reflection unit such that the light is scanned on an examined eye, and to receive light that has been scanned on the examined eye and reflected by the reflection unit, wherein:
 a focal length of the first concave mirror is the same as a focal length of the second concave mirror, the first concave mirror and the second concave mirror are both parabolic surface mirrors, the first concave mirror and the second concave mirror of the reflection unit each include an aperture on an optical axis and have an opposing arrangement to each other in which at least one of a focal point of the first concave mirror or a focal point of the second concave mirror is positioned at the aperture of the other concave mirror, and in which light rays from the focal point of the first concave mirror are reflected by the first concave mirror and the second concave mirror so as to converge as light toward the focal point of the second concave mirror, and
 the lens unit includes an angle conversion lens that is arranged at a conjugate position to a pupil of the examined eye, which is at a position of the aperture of the second concave mirror, and arranged at a position of the aperture of the first concave mirror which is furthest toward an examined eye side of the lens unit, and that converts an angle of wide-angled converging light from the reflection unit to a smaller angle.

2. The ophthalmic device of claim 1, wherein a reflection surface is formed on a lens unit side so as to have an aperture satisfying the following conditional equation:

$$\theta x \leq 22.5°,$$

wherein fa is a focal length of one of the first concave mirror or the second concave mirror, fb is a focal length of another of the first concave mirror or the second concave mirror, and a radiating angle θx from a center of one of the apertures with respect to the other aperture is given by $$\theta x = \tan^{-1}((B(A/C)^{1/2}/(A/4-B^2/C)),$$

wherein A=4fa, B=fb−fa, and C=fa fb/(fa+fb).

3. The ophthalmic device of claim 1, wherein: the angle conversion lens is formed so as to function as a negative lens in a case in
 which the angle conversion lens is arranged inside a focal point position of the first concave mirror or the second concave mirror opposing the aperture where the angle conversion lens is arranged.

4. The ophthalmic device of claim 1, wherein:
 the angle conversion lens is formed so as to function as a positive lens in a case in which the angle conversion lens is arranged outside a focal point position of the first concave mirror or the second concave mirror opposing the aperture where the angle conversion lens is arranged.

5. The ophthalmic device of claim 1, wherein: the lens unit includes two positive lens groups receiving light from the angle conversion lens; and
 a configuration is adopted such that a pupil of the lens unit is positioned at a conjugate position to a pupil of an examined eye produced by the reflection unit, and a fundus image of the examined eye is formed by light from the examined eye in a lens group at a reflection unit side among the positive lens groups.

6. The ophthalmic device of claim 4, wherein the lens unit includes a lens that is moveable along the optical axis with respect to another lens.

7. The ophthalmic device of claim 1, wherein an angle of converging light converged by the second concave mirror is an angle of 100° or greater for an external illumination angle from a pupil of an examined eye.

8. An ophthalmic device comprising:
 a light source configured to emit light of a prescribed wavelength;
 the ophthalmic device of claim 1;
 a scanning member arranged at a position conjugate to a pupil of the lens unit and configured to scan light from the light source toward an examined eye through the lens unit and the reflection unit; and
 an imaging section configured to image a fundus of the examined eye with light scanned by the scanning member.

9. The ophthalmic device of claim 8, wherein:
 the reflection unit enables light of an angle of 100° or greater as an external illumination angle from a pupil of the examined eye to be detected to enable fundus imaging at an angle of view of 100° or greater.

10. The ophthalmic device of claim 8, further comprising an insertion- removal section configured to insert onto an optical axis or remove from an optical axis at least the reflection unit and the angle conversion lens included in the lens unit, wherein the imaging section is configured to image a ring-shaped region surrounding a near-axis region where the fundus of the examined eye and the optical axis intersect in a state in which at least the reflection unit and the angle conversion lens included in the lens unit have been arranged on the optical axis by the insertion-removal section.

11. The ophthalmic device of claim 10, further comprising a movable section configured to move the lens unit excluding the angle conversion lens in a direction along the optical axis, wherein the imaging section images a near-axis region of the fundus of the examined eye in a state in which at least the reflection unit and the angle conversion lens included in the lens unit have been separated by the insertion-removal section and the lens unit excluding the angle conversion lens has been moved toward the examined eye by the movable section.

12. An optical system comprising:

a first acquisition section configured to acquire a first image of a near-axis region where the fundus of the examined eye imaged by the ophthalmic device of claim 8 and the optical axis intersect;

a second acquisition section configured to acquire a second image of a ring-shaped region of the fundus of the examined eye at a periphery of the near-axis region; and a forming section configured to combine the first image acquired by the first acquisition section and the second image acquired by the second acquisition section to form a wide image of the examined eye.

* * * * *